US011300944B2

(12) United States Patent
Isobe

(10) Patent No.: US 11,300,944 B2

(45) Date of Patent: Apr. 12, 2022

(54) INFORMATION PROCESSING APPARATUS, COMPUTER READABLE MEDIUM STORING INFORMATION PROCESSING PROGRAM, AND THREE-DIMENSIONAL MODELING SYSTEM

(71) Applicant: FUJIFILM BUSINESS INNOVATION CORP., Tokyo (JP)

(72) Inventor: Kimihiko Isobe, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 181 days.

(21) Appl. No.: 16/849,459

(22) Filed: Apr. 15, 2020

(65) Prior Publication Data

US 2021/0141361 A1 May 13, 2021

(30) Foreign Application Priority Data

Nov. 8, 2019 (JP) ............................ JP2019-203456

(51) Int. Cl.

*B33Y 50/02* (2015.01)
*G05B 19/4093* (2006.01)

(52) U.S. Cl.

CPC ........ *G05B 19/40932* (2013.01); *B33Y 50/02* (2014.12); *G05B 2219/45187* (2013.01); *G05B 2219/49005* (2013.01)

(58) Field of Classification Search

CPC ...................................................... B33Y 50/02

See application file for complete search history.

(56) References Cited

U.S. PATENT DOCUMENTS

| | | | | |
|---|---|---|---|---|
| 6,413,360 | B1 | 7/2002 | Morita et al. | |
| 9,073,259 | B2 | 7/2015 | Dufort et al. | |
| 10,552,095 | B1 * | 2/2020 | Lawson | G06F 3/1218 |
| 2017/0261965 | A1 | 9/2017 | Shiihara | |
| 2019/0308371 | A1 * | 10/2019 | Knecht | B29C 64/236 |
| 2020/0061928 | A1 * | 2/2020 | Xiang | B33Y 30/00 |

FOREIGN PATENT DOCUMENTS

| | | |
|---|---|---|
| JP | 2017-111397 A | 6/2017 |
| JP | 2017-159634 A | 9/2017 |

OTHER PUBLICATIONS

Dec. 15, 2020 Office Action issued in Australian Patent Application No. 2020202720.

* cited by examiner

*Primary Examiner* — Mark A Connolly

(74) *Attorney, Agent, or Firm* — Oliff PLC

(57) ABSTRACT

An information processing apparatus includes a processor, and the processor is configured to: acquire three-dimensional image data for printing processing for modeling a three-dimensional modeled object by forming respective images on recording media and stacking the recording media, and other image data for other printing processing, determine an arrangement to form at least one of the respective images and at least a part of the other image data on same one of the recording media so as to reduce a difference between a height corresponding to the number of recording media to which the other image data is to be recorded and a height of the three-dimensional modeled object, and output image forming information for forming the three-dimensional image data and the other image data on the recording media to an image forming apparatus based on the determined arrangement.

18 Claims, 16 Drawing Sheets

10: INFORMATION PROCESSING APPARATUS
31
EXTERNAL DEVICE
32
34
36
38
OPERATION UNIT
DISPLAY UNIT
COMMUNICATION UNIT
STORAGE UNIT
30
30E
I/O
CONTROL UNIT
CPU
ROM
RAM
MEMORY
30F
30A
30B
30C
30D

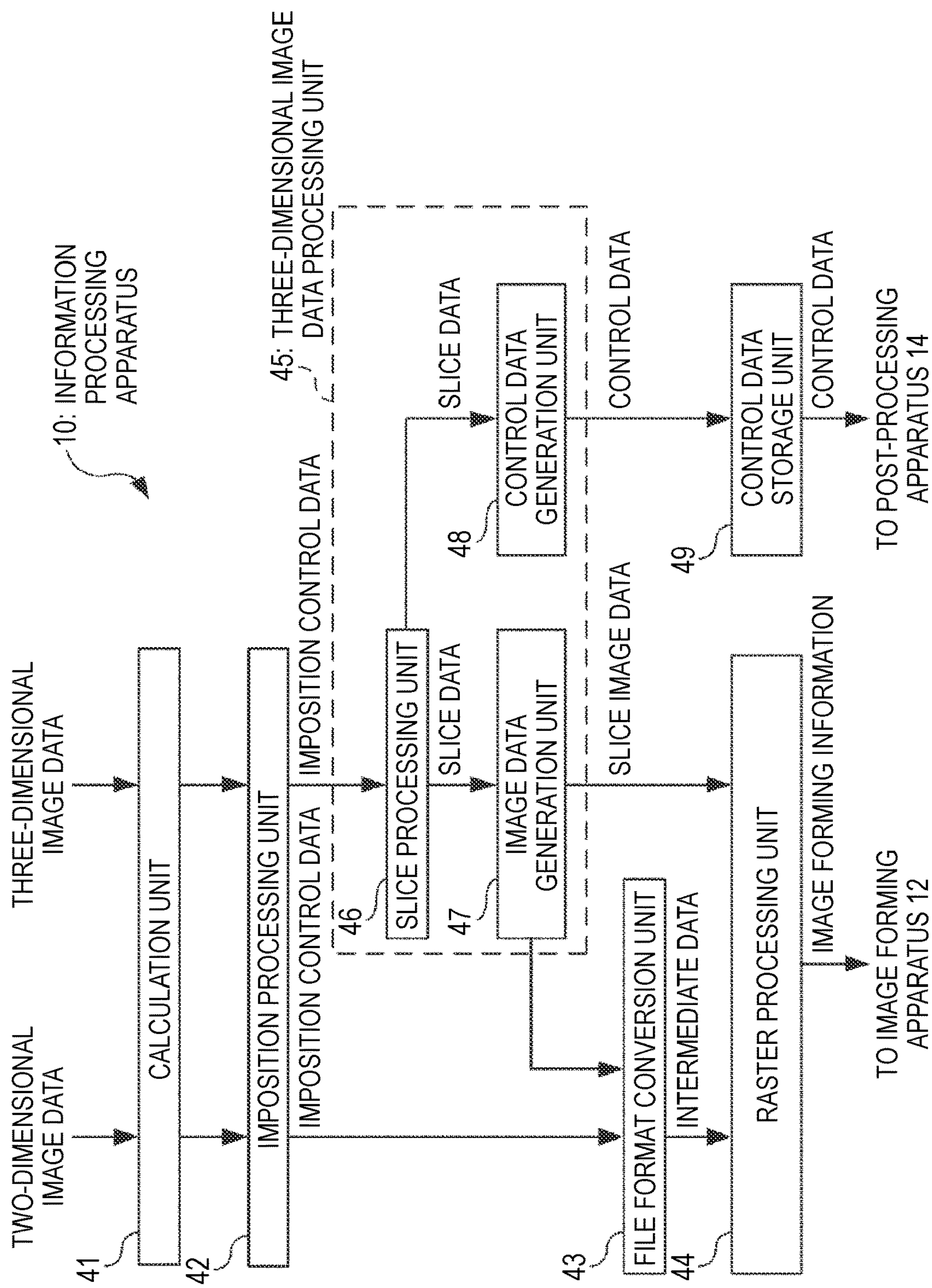
FIG. 8
10: INFORMATION PROCESSING APPARATUS
TWO-DIMENSIONAL IMAGE DATA
THREE-DIMENSIONAL IMAGE DATA
41
CALCULATION UNIT
42
IMPOSITION PROCESSING UNIT
IMPOSITION CONTROL DATA
IMPOSITON CONTROL DATA
IMPOSITION CONTROL DATA
45: THREE-DIMENSIONAL IMAGE DATA PROCESSING UNIT
46
SLICE PROCESSING UNIT
SLICE DATA
SLICE DATA
47
IMAGE DATA GENERATION UNIT
48
CONTROL DATA GENERATION UNIT
CONTROL DATA
SLICE IMAGE DATA
43
FILE FORMAT CONVERSION UNIT
INTERMEDIATE DATA
44
RASTER PROCESSING UNIT
IMAGE FORMING INFORMATION
TO IMAGE FORMING APPARATUS 12
49
CONTROL DATA STORAGE UNIT
CONTROL DATA
TO POST-PROCESSING APPARATUS 14

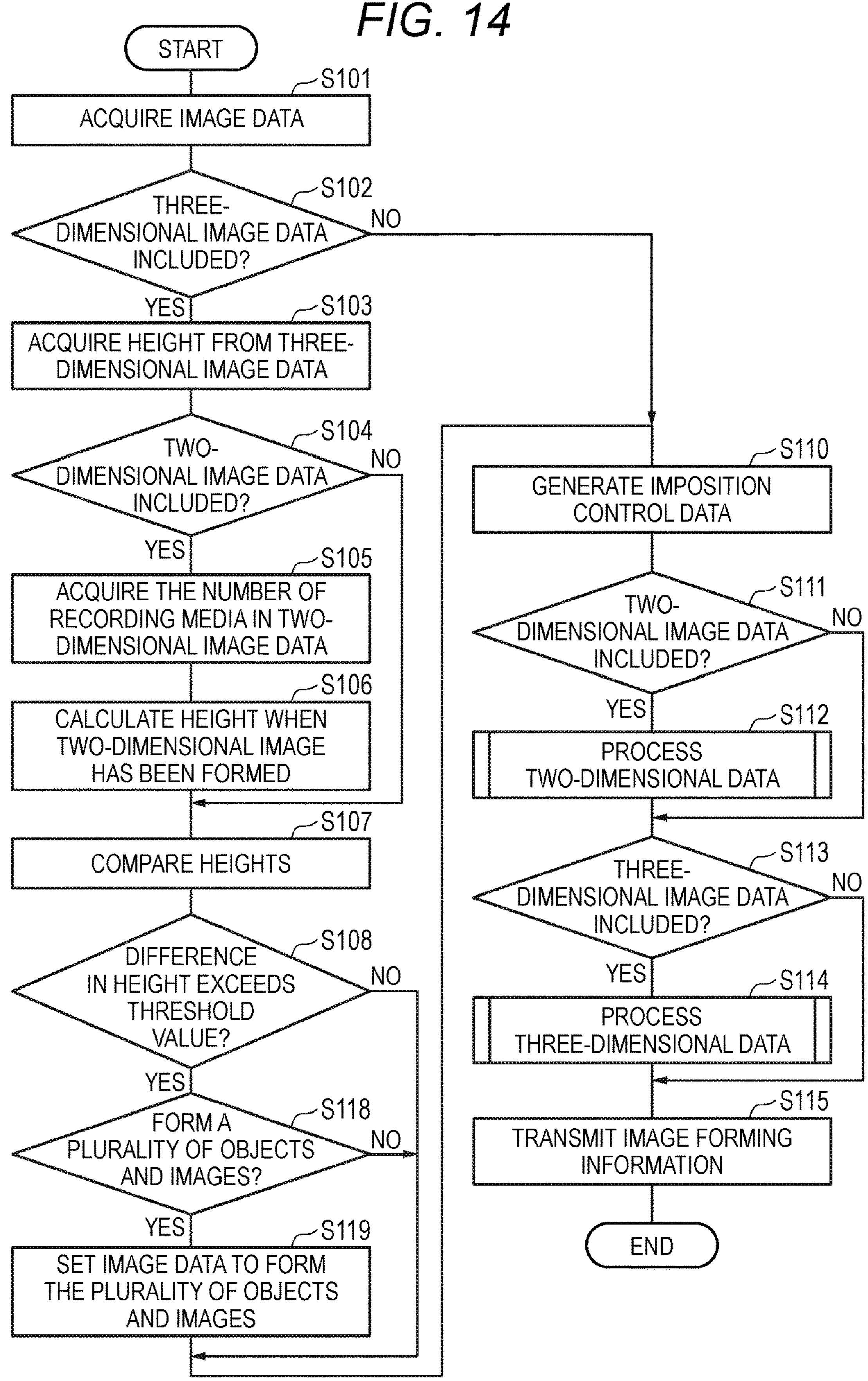
FIG. 14
START
S101
ACQUIRE IMAGE DATA
S102
THREE-DIMENSIONAL IMAGE DATA INCLUDED?
NO
YES
S103
ACQUIRE HEIGHT FROM THREE-DIMENSIONAL IMAGE DATA
S104
TWO-DIMENSIONAL IMAGE DATA INCLUDED?
NO
YES
S105
ACQUIRE THE NUMBER OF RECORDING MEDIA IN TWO-DIMENSIONAL IMAGE DATA
S106
CALCULATE HEIGHT WHEN TWO-DIMENSIONAL IMAGE HAS BEEN FORMED
S107
COMPARE HEIGHTS
S108
DIFFERENCE IN HEIGHT EXCEEDS THRESHOLD VALUE?
NO
YES
S118
FORM A PLURALITY OF OBJECTS AND IMAGES?
NO
YES
S119
SET IMAGE DATA TO FORM THE PLURALITY OF OBJECTS AND IMAGES
S110
GENERATE IMPOSITION CONTROL DATA
S111
TWO-DIMENSIONAL IMAGE DATA INCLUDED?
NO
YES
S112
PROCESS TWO-DIMENSIONAL DATA
S113
THREE-DIMENSIONAL IMAGE DATA INCLUDED?
NO
YES
S114
PROCESS THREE-DIMENSIONAL DATA
S115
TRANSMIT IMAGE FORMING INFORMATION
END

INFORMATION PROCESSING APPARATUS, COMPUTER READABLE MEDIUM STORING INFORMATION PROCESSING PROGRAM, AND THREE-DIMENSIONAL MODELING SYSTEM

CROSS-REFERENCE TO RELATED APPLICATIONS

This application is based on and claims priority under 35 USC 119 from Japanese Patent Application No. 2019-203456 filed on Nov. 8, 2019.

BACKGROUND

1. Technical Field

The present invention relates to an information processing apparatus, a computer readable medium storing an information processing program, and a three-dimensional modeling system.

2. Related Art

JP-A-2017-111397 discloses a sheet stacking molding paper pattern in which an adhesive layer that has been applied to a back surface of a base member is protected by release paper, in which a pattern of a part used for modeling a three-dimensional model, a number indicating a stacking order of the part, and a mark used for alignment of the part are printed on a surface of the base member, and in which a half cut that cuts up to the base member and the adhesive layer is processed along a contour of the part.

SUMMARY

Without being limited to a case of forming a three-dimensional modeled object, when recording is performed on a recording medium, it is possible to reduce generation of an extra recording medium by performing processing (ganging) of performing setting so as to record different image data at different positions of a same plate.

For example, when a recording medium is stacked to form a three-dimensional modeled object, there is a technique of recording parts of each three-dimensional modeled object that has been divided for each part on the same plate.

Aspects of non-limiting embodiments of the present disclosure related to an information processing apparatus, an information processing program, and a three-dimensional modeling system that are capable of reducing generation of an extra recording medium when a height of a three-dimensional modeled object is different from a height, a thickness, or the like of the recording medium when another piece of printing processing has been performed in a system configured to generate a plate of printing processing including printing processing related to a three-dimensional modeled object.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to acquire three-dimensional image data for printing processing for modeling a three-dimensional modeled object by forming respective images on a plurality of recording media and stacking the plurality of the recording media, and other image data for other printing processing than the printing processing for modeling the three-dimensional modeled object, determine an arrangement to form at least one of the respective images and at least a part of the other image data on same one of the recording media so as to reduce a difference between a height corresponding to the number of recording media to which the other image data is to be recorded and a height of the three-dimensional modeled object in the three-dimensional image data, and output image forming information for forming the three-dimensional image data and the other image data on the recording media to an image forming apparatus based on the determined arrangement.

BRIEF DESCRIPTION OF DRAWINGS

Exemplary embodiments of the present invention will be described in detail based on the following figures, wherein:

FIG. 8 is a functional block diagram showing a functional configuration example of the information processing apparatus according to the exemplary embodiments;

FIG. 14 is a flowchart showing an example of a processing procedure of an information processing program according to the third exemplary embodiment;

DETAILED DESCRIPTION

Figure 1A:
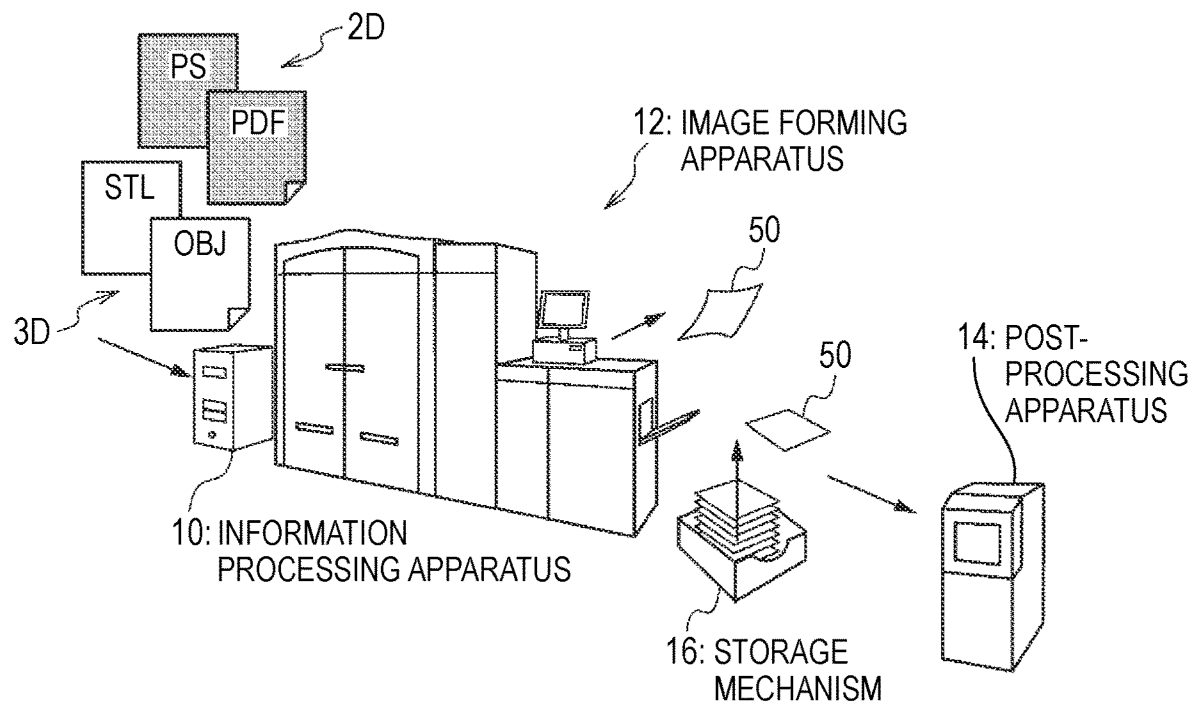
FIGS. 1A and 1B illustrate a schematic configuration example of a three-dimensional modeling system according to exemplary embodiments.

Exemplary embodiments of the present disclosure will be described in detail below with reference to the drawings. Components and processing having the same function are denoted by the same reference numerals throughout the drawings, and a repetitive description thereof will be omitted.

(Three-Dimensional Modeling System: Overall Configuration)

First, the three-dimensional modeling system will be described.

When two-dimensional image data is received, for example, when an image is formed on a recording medium based on an electrophotographic method and three-dimensional image data is received, the three-dimensional modeling system produces a three-dimensional modeled object based on a sheet stacking type three-dimensional modeling method of stacking the recording medium.

In the sheet stacking type three-dimensional modeling method, three-dimensional image data of a three-dimensional model is sliced on a plurality of surfaces to generate a plurality of pieces of slice data, and a series of slice images are formed on a sheet-shaped recording medium which is paper or the like based on the plurality of pieces of slice data. Then, post-processing for three-dimensional modeling, for example, of processing and stacking a plurality of recording media on which the series of slice images have been formed, is performed on the plurality of recording media. Here, “the series” means corresponding to “the plurality of pieces of slice data” generated from the three-dimensional image data.

Figure 1B:
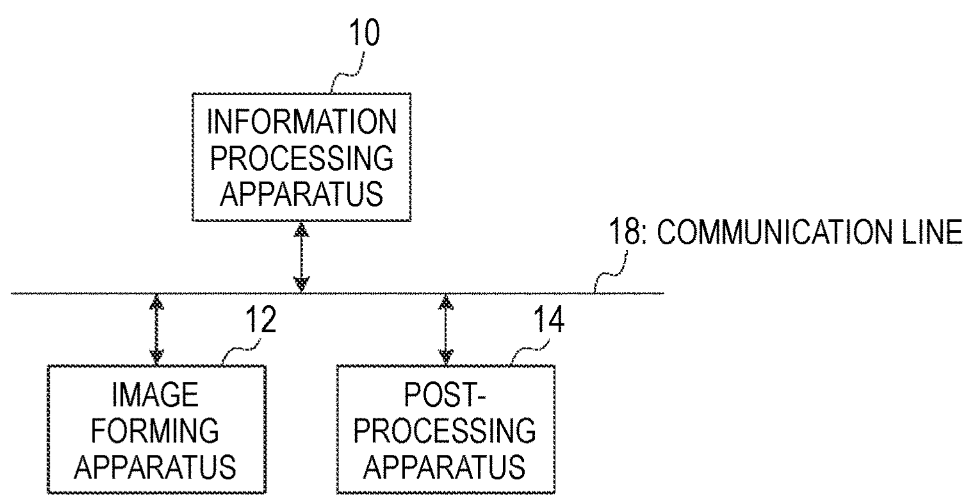
Figure 2:
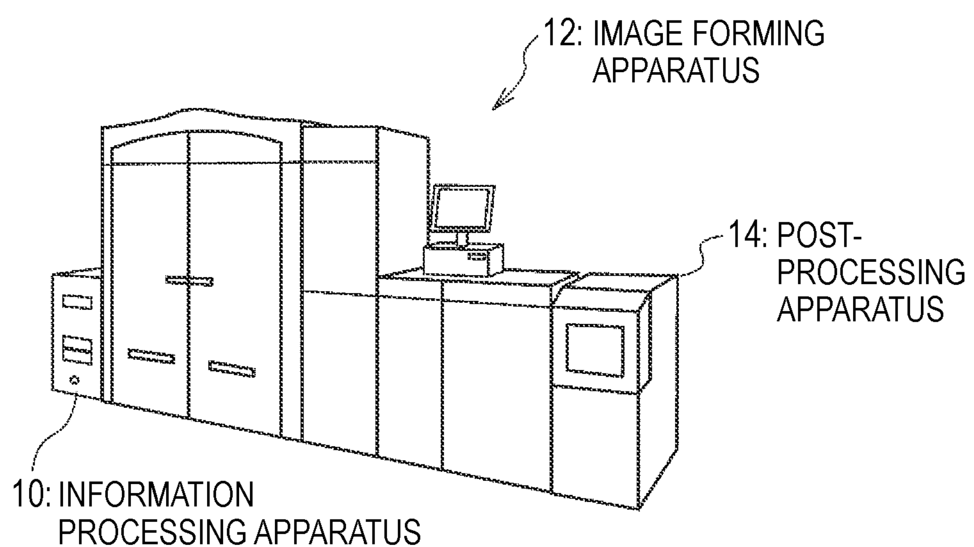
FIG. 2 illustrates another schematic configuration example of the three-dimensional modeling system according to the exemplary embodiments.

FIGS. 1A and 1B are schematic views illustrating a configuration example of a three-dimensional modeling system according to the present exemplary embodiment. FIG. 2 is a schematic view illustrating another configuration example of the three-dimensional modeling system according to the present exemplary embodiment. As illustrated in FIG. 1A, the three-dimensional modeling system according to the present exemplary embodiment includes an information processing apparatus 10, an image forming apparatus 12, and a three-dimensional modeling post-processing apparatus 14. As illustrated in FIG. 1B, each of the information processing apparatus 10, the image forming apparatus 12, and the three-dimensional modeling post-processing apparatus 14 is communicably connected to one another via a communication line 18. Hereinafter, the three-dimensional modeling post-processing apparatus 14 is abbreviated as the “post-processing apparatus 14”.

The image forming apparatus 12 is configured to form an image on a recording medium 50 based on raster image data. In the present exemplary embodiment, the image forming apparatus 12 is not dedicated to three-dimensional modeling. When image formation based on the two-dimensional image data is instructed, the image forming apparatus 12 functions as a normal image forming apparatus. Therefore, the information processing apparatus 10 performs different information processing depending on whether to form the image based on the two-dimensional image data or to perform three-dimensional modeling based on the three-dimensional image data.

The image forming apparatus 12 is configured to, for example, form an image on a recording medium based on the electrophotographic method. The image forming apparatus 12 using the electrophotographic method includes a photosensitive drum, a charging device, an exposure device, a developing device, a transfer device, a fixing device, and the like. The charging device is configured to charge the photosensitive drum. The exposure device is configured to expose the charged photosensitive drum with light corresponding to an image. The developing device is configured to develop an electrostatic latent image that has been formed on the photosensitive drum by performing exposure using toner. The transfer device is configured to transfer a toner image that has been formed on the photosensitive drum to a recording medium. The fixing device is configured to fix the toner image transferred to the recording medium. The image forming apparatus 12 may be an inkjet recording apparatus. In this case, the image forming apparatus 12 includes an inkjet recording head and the like in which the inkjet recording head is configured to eject ink droplets onto the recording medium according to an image.

The information processing apparatus 10 generates a plurality of pieces of slice data from the three-dimensional image data when receiving an instruction to model a three-dimensional modeled object based on the three-dimensional image data. Next, in order to form a series of raster images, a series of pieces of raster image data is generated from the plurality of pieces of slice data. Then, the series of pieces of raster image data is output to the image forming apparatus 12. When an instruction to form a two-dimensional image based on the two-dimensional image data is received, raster image data is generated from the two-dimensional image data, and the raster image data of the two-dimensional image is output to the image forming apparatus 12.

The information processing apparatus 10 further generates a series of pieces of control data from the plurality of pieces of slice data when receiving the instruction to model a three-dimensional modeled object based on the three-dimensional image data. The series of pieces of control data is used for causing the post-processing apparatus 14 to perform post-processing for three-dimensional modeling. As will be described below, the control data includes control data for specifying a “cutout line” for cutting out a stacked component from the recording medium, and control data for specifying a “glued region” for applying glue to the recording medium.

The post-processing apparatus 14 is configured to perform the post-processing for three-dimensional modeling on the recording medium 50 on which a series of slice images have been formed. As illustrated in FIG. 1A, the post-processing apparatus 14 may not share a conveyance path of the recording medium 50 with the image forming apparatus 12 (offline or near-line). As illustrated in FIG. 2, the post-processing apparatus 14 may share the conveyance path of the recording medium 50 with the image forming apparatus 12 (inline).

When the conveyance path is not shared, the plurality of recording media 50 on which the series of slice images have been formed are stacked in order of formation of the slice images, and are stored in a storage mechanism 16 which is a stacker or the like. A bundle of the plurality of stacked recording media 50 is taken out from the storage mechanism 16 and is collectively delivered to the post-processing apparatus 14. On the other hand, when the conveyance path is shared, the recording media 50 on which the slice images have been formed are conveyed to the post-processing apparatus 14 one by one.

The information processing apparatus 10 according to the present exemplary embodiment receives three-dimensional image data of the three-dimensional modeled object to be modeled on the recording medium 50 as the above-described three-dimensional image data.

(Sheet Stacking Type Three-Dimensional Modeling)

Next, each step of the sheet stacking type three-dimensional modeling will be described.

Figure 3A:
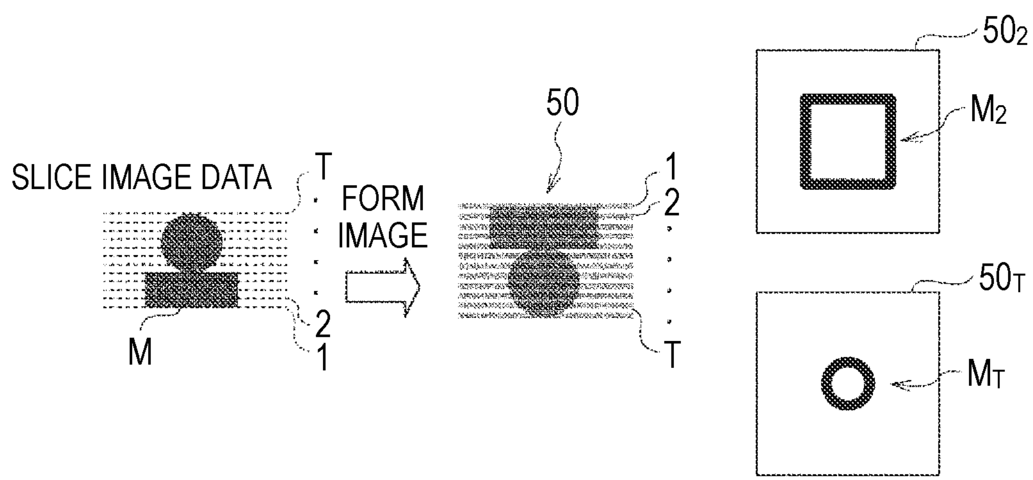
FIGS. 3A and 3B are schematic views illustrating an example of a sheet stacking type three-dimensional modeling process according to the exemplary embodiments.
Figure 3B:
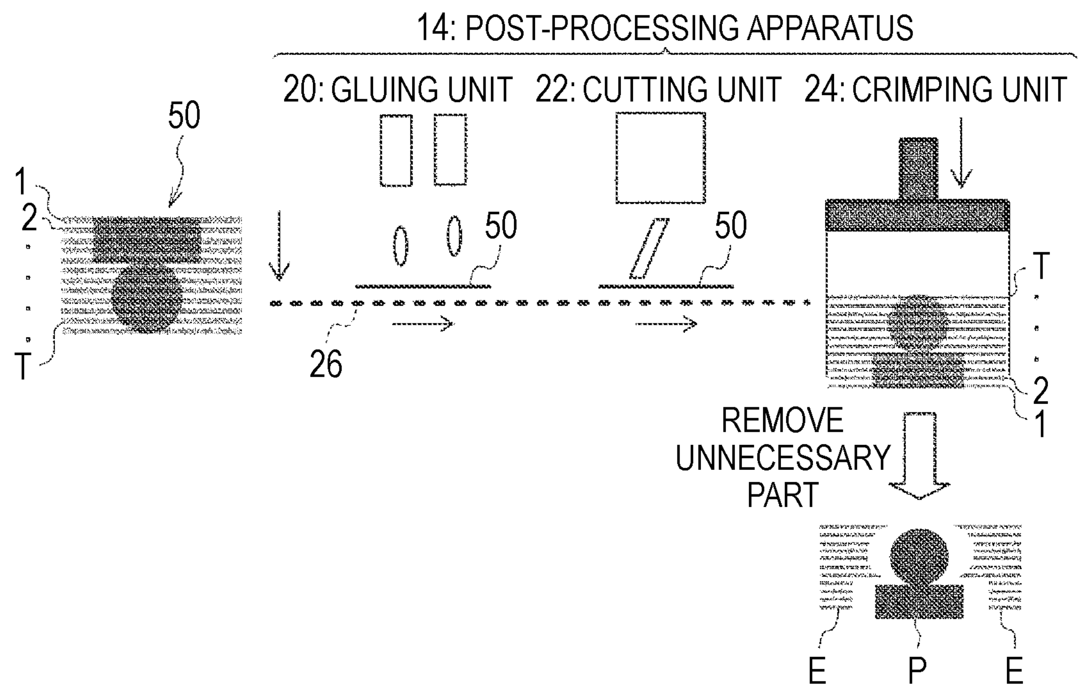

FIG. 3A is a schematic view illustrating an image forming process of the sheet stacking type three-dimensional modeling using three-dimensional image data. FIG. 3B is a schematic view illustrating a post-processing process of the sheet stacking type three-dimensional modeling.

First, as illustrated in FIG. 3A, the information processing apparatus 10 generates a plurality of pieces of slice data from three-dimensional image data of the three-dimensional model M. In an example of the present exemplary embodiment, t pieces of slice data from number 1 to number T are generated. The T pieces of slice data from number 1 to number T are converted into raster image data so as to form T slice images from number 1 to number T, respectively.

Next, as illustrated in FIG. 3A, the slice image is formed on the recording medium. The image forming apparatus 12 forms the series of slice images on the recording medium 50 based on the series of pieces of raster image data. A plurality of recording media $50_1$ to $50_T$ on which the series of slice images have been formed are stacked in the order of the formation of the slice images. When "number n" is the number from number 1 to number T, an n-th slice image is formed on an n-th recording medium 50*n*.

In the illustrated example, the T slice images from number 1 to number T are formed in descending order from number T to number 1. The plurality of recording media $50_1$ to $50_T$ are stacked in descending order from number T to number 1. The recording medium 50T on which a T-th slice image is formed is the lowest layer. The plurality of recording media $50_1$ to $50_T$ are stacked in descending order, so that the plurality of recording media $50_1$ to $50_T$ are supplied in ascending order from number 1 to number T in the subsequent post-processing process. That is, the T slice images are formed on the recording medium 50 in an order "reverse" to the order of the post-processing performed by the post-processing apparatus 14.

Next, as illustrated in FIG. 3B, the post-processing is performed on the recording medium 50 on which the slice image has been formed. The post-processing apparatus 14 includes a gluing unit 20 configured to perform gluing processing, a cutting unit 22 configured to perform cutting processing, and a crimping unit 24 configured to perform crimping processing. The gluing unit 20, the cutting unit 22, and the crimping unit 24 are provided in the order described along the conveyance path 26 configured to convey the recording medium 50. The post-processing apparatus 14 acquires the series of pieces of control data corresponding to the series of slice images from the information processing apparatus 10.

Here, the slice image will be described.

Figure 4A:
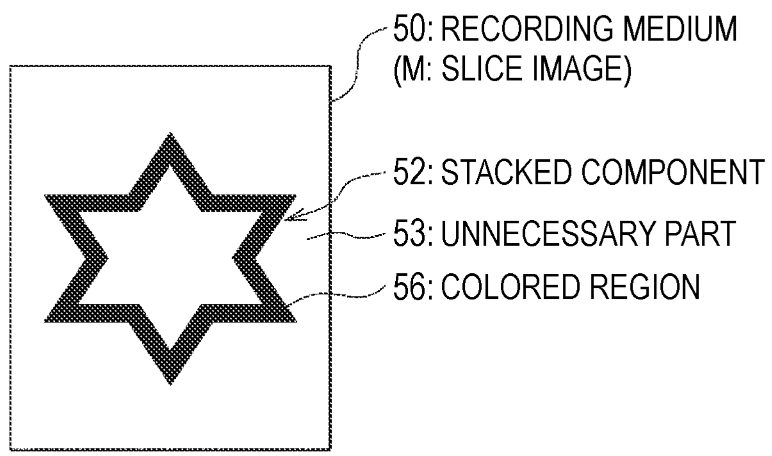
FIGS. 4A, 4B and 4C are schematic views illustrating an example of a slice image according to the exemplary embodiments.
Figure 4B:
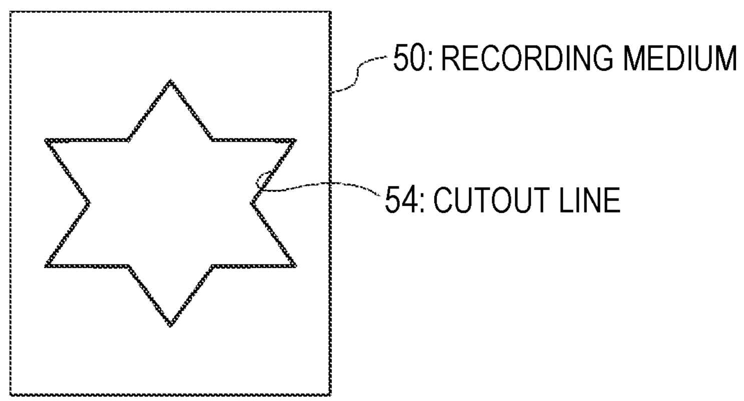
Figure 4C:
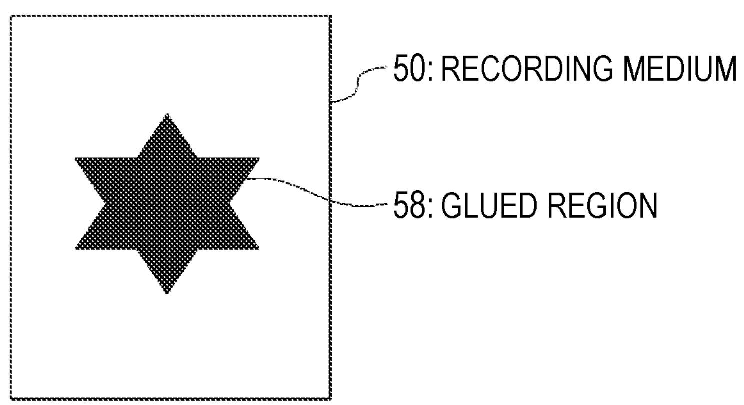

FIGS. 4A to 4C are schematic views illustrating an example of a state in which the slice image is formed on the recording medium. As illustrated in FIG. 4A, the slice image on the recording medium 50 includes a stacked component 52 that is stacked to form a three-dimensional modeled object and an unnecessary part 53. A colored region 56 having a set width is formed at a periphery of the stacked component 52. As illustrated in FIG. 4B, an outer peripheral line of the stacked component 52 is a cutout line 54 for cutting out the stacked component 52 from the recording medium 50.

As illustrated in FIG. 4C, for example, a glued region 58 is set inside the outer peripheral line (the cutout line 54) of the stacked component 52, for example, in a region inside the colored region 56. An entire surface of the recording medium 50 including the unnecessary part 53 may be glued. However, by setting the glued region 58 inside the outer peripheral line of the stacked component 52, operation of removing a removal target E (see FIG. 3B) is easier than that in a case of gluing the entire surface. The glued region 58 is set inside the outer peripheral line of the stacked component 52, so that glue does not protrude from the stacked component 52 during the crimping processing after the gluing.

Setting of a width of the colored region 56 and setting of a retreat width of the glued region 58 from the outer peripheral line of the stacked component 52 may be performed when a user instructs the three-dimensional modeling, for example, when a setting screen is displayed on a display unit 34 of the information processing apparatus 10 and the setting from the user is received by the operation unit 32. Predetermined initial setting may be used.

The control data includes control data for specifying the cutout line 54 and control data for specifying the glued region 58. For example, coordinate data of a point on a path of the cutout line 54 is the control data for specifying the cutout line 54. Coordinate data of each point in the glued region 58 is the control data for specifying the glued region 58.

The recording media 50 are supplied to the gluing unit 20 one by one from the bundle of the plurality of recording media 50. The gluing unit 20 is configured to apply glue to the glued region 58 of the recording medium 50 based on the control data for specifying the glued region 58. The gluing unit 20 may include, for example, a glue ejection head configured to eject glue. The glue ejection head moves in a stacking direction (a w direction) and an in-plane direction (a u direction and a v direction) of the recording medium 50. The glue ejection head moves the glued region 58 while ejecting glue, so that the glue is applied to the glued region 58 of the recording medium 50. The recording medium 50 on which the gluing processing has been completed is supplied to the cutting unit 22.

The cutting unit 22 is configured to cut the recording medium 50 along the cutout line 54 based on the control data for specifying the cutout line 54. The cutting unit 22 may be, for example, a cutter including a cutting edge. The cutting edge of the cutter moves in the stacking direction (the w direction) and the in-plane direction (the u direction and the v direction) of the recording medium 50. The cutting edge of the cutter is moved in the in-plane direction while being pressed against the recording medium 50, so that the recording medium 50 is cut.

A depth of the cutting is determined by adjusting a position of the cutting edge of the cutter in the stacking direction. The depth of the cutting may be a depth that does not reach a back surface. The stacked component is not separated from the recording medium 50, so that a lack of the stacked component 52 in a conveyance process is avoided.

The cutter needs only to have a function of cutting the recording medium 50 along the cutout line 54, and is not limited to a mechanical cutter that presses the cutting edge.

For example, an ultrasonic cutter that radiates an ultrasonic wave to perform cutting or a laser cutter that radiates laser light to perform cutting may be used.

The cutting unit 22 may form a plurality of perforations in the recording medium 50 along the cutout line 54 instead of performing cutting. When the plurality of perforations are formed, the stacked component is connected to the recording medium 50, so that the lack of the laminated component 52 in the conveyance process is further avoided.

The recording medium 50 on which the cutting processing has been completed is supplied to the crimping unit 24. The crimping unit 24 sequentially stacks the supplied recording medium 50. At this time, the plurality of recording media $\mathbf{50}_1$ to $\mathbf{50}_T$ are stacked in ascending order from number 1 to number T. The crimping unit 24 is configured to crimp the plurality of recording media 50 by applying pressure to the bundle of the plurality of stacked recording media 50 along the stacking direction. Each of the plurality of glued recording media $\mathbf{50}_1$ to $\mathbf{50}_T$ is adhered to upper and lower recording media 50 in the glued region 58 by being crimped.

The recording medium 50 on which the cutting processing has been completed includes the stacked component 52 that is stacked to form a three-dimensional modeled object P and the unnecessary part 53, but are stacked integrally without removing the unnecessary part 53. The unnecessary part 53 of the recording medium 50 is a support member configured to support the three-dimensional modeled object P obtained by stacking the stacked component 52. After the crimping processing performed by the crimping unit 24 has been completed, the removal target E formed by stacking the stacked component 52 of the recording medium 50 is removed to separate the three-dimensional modeled object P.

Next, an example of the "control data" will be described.

Figure 5B:
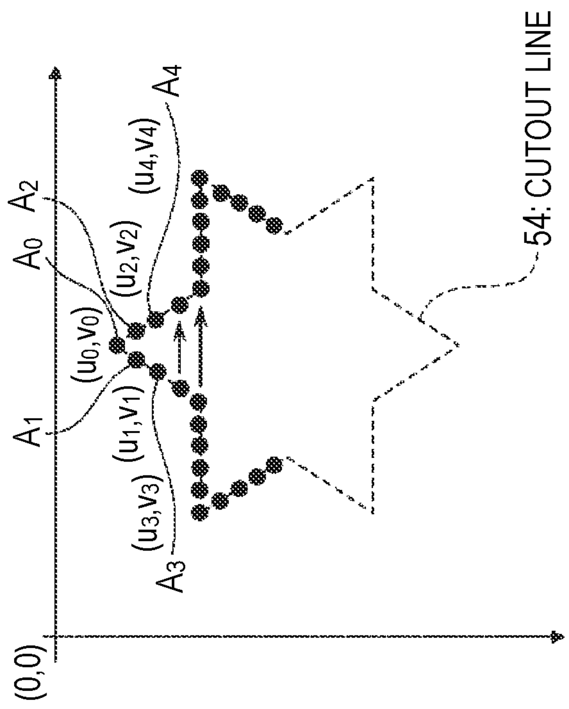
FIGS. 5A and 5B are schematic views illustrating an example of control data for specifying a cutout line according to the exemplary embodiments.
Figure 5A:
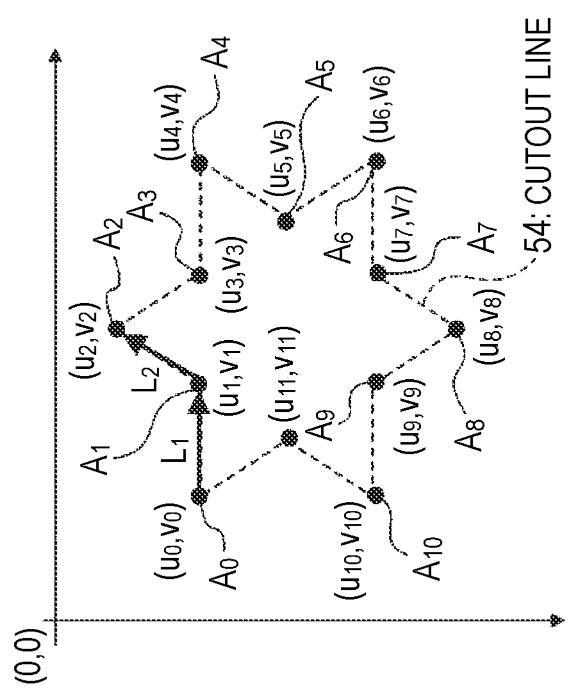
Figure 6B:
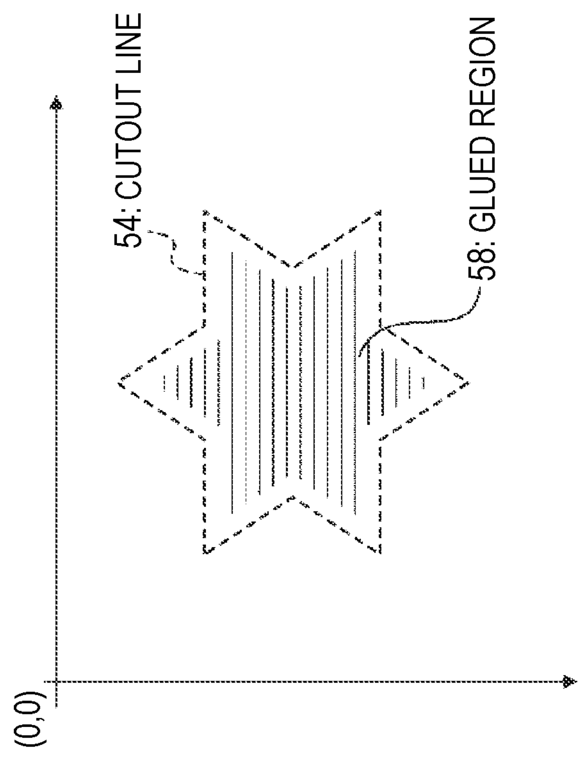
FIGS. 6A and 6B are schematic views illustrating an example of control data for specifying a glued region according to the exemplary embodiments.
Figure 6A:
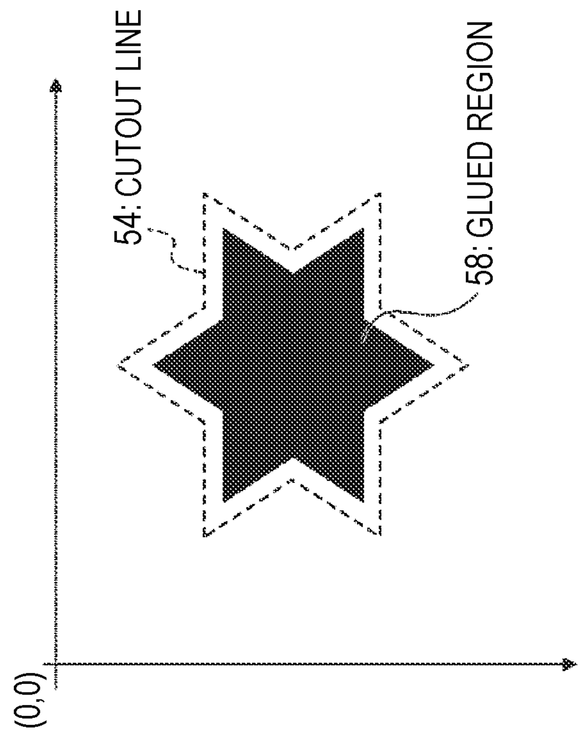

FIGS. 5A and 5B are schematic views illustrating an example of the control data for specifying the cutout line. FIGS. 6A and 6B are schematic views illustrating an example of the control data for specifying the glued region. As will be described below, stacking data includes coordinate data of a vertex of an intersection region where a polygon and a slice surface intersect. The intersection region is present along the outer peripheral line of the stacked component 52. Therefore, as illustrated in FIG. 5A, the coordinate data of the points on the path of the cutout line 54, which is coordinates $(u_0, v_0)$ of a point $A_0$ and the like, is the control data for specifying the cutout line 54.

In the illustrated example, the star-shaped stacked component 52 has eleven vertices $A_0$ to $A_{10}$. For example, when the point $A_0$ is set as a start point, the cutout line 54 is specified by tracing the points in order of $A_0 \rightarrow A_1 \rightarrow A_2 \rightarrow A_3 \rightarrow A_4 \rightarrow A_5 \rightarrow A_6 \rightarrow A_7 \rightarrow A_8 \rightarrow A_9 \rightarrow A_{10}$.

As illustrated in FIG. 5B, when the plurality of perforations are formed, coordinate data of perforation points on the path of the cutout line 54 is the control data for specifying the cutout line 54. For example, when the point $A_0$ is set as a start point, the cutout line 54 is specified by tracing the points in order such as $A_0 \rightarrow A_1 \rightarrow A_2 \rightarrow A_3 \rightarrow A_4$ . . . corresponding the order in which perforations are formed.

As illustrated in FIG. 6A, coordinate data of points in the glued region 58 is the control data for specifying the glued region 58. The glued region 58 is slightly smaller than the stacked component 52, and is set inside the outer peripheral line of the stacked component 52. The glued region 58 may be specified by reducing an image of the stacked component 52. In this case, the glued region 58 is provided such that a center of gravity of the image of the stacked component 52 matches a center of gravity of the glued region 58. The coordinate data of the points in the glued region 58 is obtained from the retreat width of the glued region 58 from the outer peripheral line of the stacked component 52 and the coordinate data of the points on the path of the cutout line 54.

As illustrated in FIG. 6B, it may not be necessary to glue entirety of the glued region 58. The glued region 58 may be partially reduced, and a part of the glued region 58 may be glued. In addition, a concentration of the glue does not need to be constant throughout the entirety of the glued region 58. When the concentration of the glue may be changed, a concentration of the glue in a periphery of the glued region 58 may be higher than a concentration of the glue at a center of the glued region 58.

An origin of the control data for specifying the cutout line 54 and an origin of the control data for specifying the glued region 58 are aligned with an origin of an image forming position when the slice image is formed. When the post-processing apparatus 14 has an image reading function, the image forming apparatus 12 may form a mark image indicating a position of the "origin of the control data" together with the slice image on the recording medium 50, and the post-processing device 14 may read the mark image and acquire position information of the "origin of the control data".

A format of the control data is not limited to the coordinate data. For example, the control data may be image data such as binary raster image data that expresses the cutout line 54 or the glued region 58 as a graphic or an image. When the control data is the binary raster image data, in the example illustrated in FIG. 4B, a pixel value of the cutout line 54 is set as "1", and a pixel value of the other regions is set as "0". In the example illustrated in FIG. 4C, a pixel value of the glued region 58 is set as "1", and a pixel value of the other regions is set as "0". For example, the glue ejection head of the gluing unit 20 ejects glue onto the recording medium 50 when the pixel value is "1". The glue ejection head does not eject glue onto the recording medium 50 when the pixel value is "0".

(Information Processing Apparatus)

Next, the information processing apparatus 10 will be described.

Figure 7:
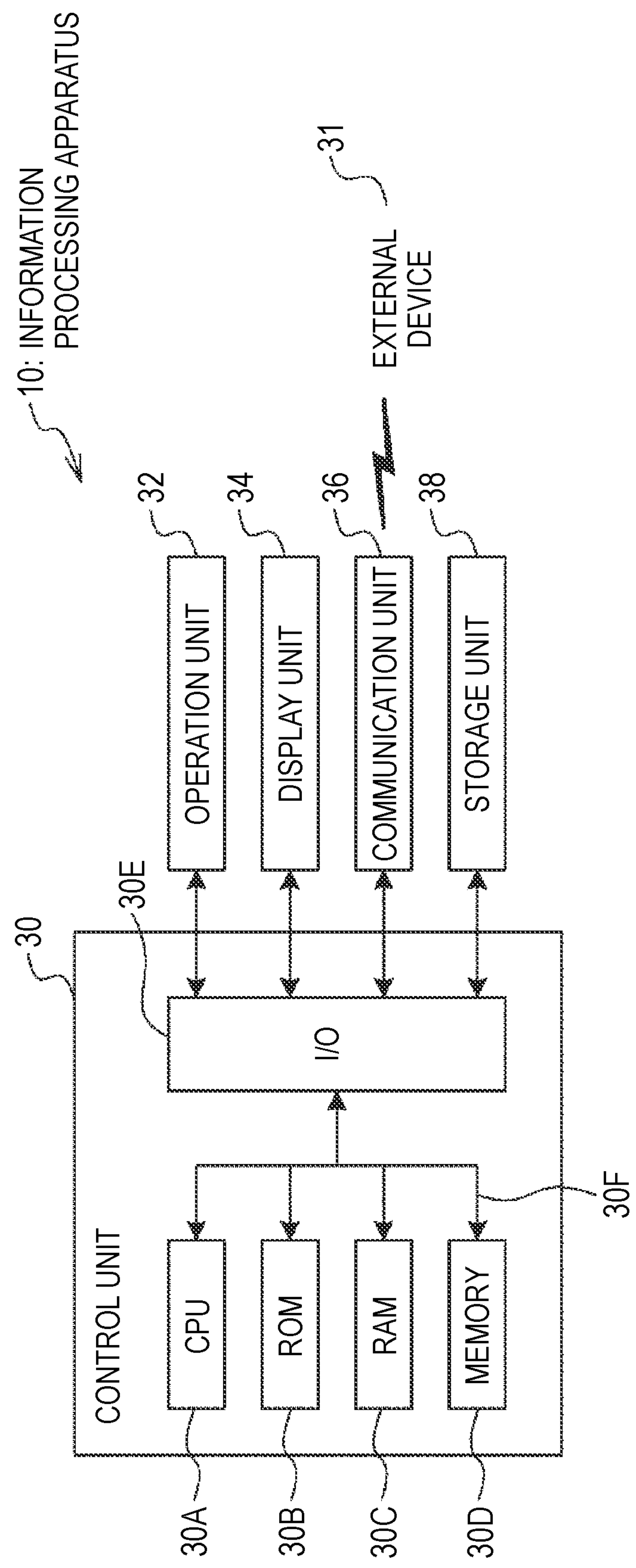
FIG. 7 is a block diagram showing a configuration example of a main part of an electric system of an information processing apparatus according to the exemplary embodiments.

FIG. 7 is a block diagram showing an electrical configuration of the information processing apparatus 10 according to the present exemplary embodiment. As shown in FIG. 7, the information processing apparatus 10 includes an information processing unit 30, an operation unit 32 configured to receive operation performed by a user, a display unit 34 configured to display information to a user, a communication unit 36 configured to communicate with an external device 31, and a storage unit 38 which is an external storage device or the like. The operation unit 32, the display unit 34, the communication unit 36, and the storage unit 38 are connected to an input and output interface (I/O) 30E of the information processing unit 30.

The information processing unit 30 includes a central processing unit (CPU) 30A, a read only memory (ROM) 30B, a random access memory (RAM) 30C, a nonvolatile memory 30D, and the I/O 30E. The CPU 30A, the ROM 30B, the RAM 30C, the nonvolatile memory 30D, and the I/O 30E are connected to one another via a bus 30F. The CPU 30A is configured to read a program from the ROM 30B, and to execute the program using the RAM 30C as a work area.

The operation unit 32 is configured to receive operation using a mouse, a keyboard, or the like from a user. The display unit 34 is configured to display various screens to the user on a display or the like. The communication unit 36 is configured to communicate with the external device 31 via a wired or wireless communication line. The communication unit 36 functions as an interface configured to communicate with the external device 31 which is a computer or the like connected to a communication line such as a local area network (LAN), a dedicated line, or the Internet. The storage unit 38 includes a storage device which is a hard disk or the like.

FIG. 8 is a functional block diagram showing a functional configuration of the information processing apparatus 10 according to the present exemplary embodiment. As shown in FIG. 8, the information processing apparatus 10 includes a calculation unit 41, an imposition processing unit 42, a file format conversion unit 43, a raster processing unit 44, a three-dimensional image data processing unit 45, and a control data storage unit 49.

The calculation unit 41 is configured to count the number of recording media 50 required for forming the two-dimensional image or for forming the three-dimensional modeled object, and to calculate a height in each of a case in which the two-dimensional image has been formed and a case in which the three-dimensional modeled object has been formed.

The imposition processing unit 42 compares the height in the case in which the two-dimensional image has been formed and the height in the case in which the three-dimensional modeled object has been formed. The two-dimensional image and the three-dimensional modeled object are to be provided on the same recording media. According to the comparison result, the imposition processing unit 42 performs processing on the three-dimensional image data in the three-dimensional modeled object so as to reduce a difference between the height corresponding to the number of the recording media 50 to which the two-dimensional image data is to be formed and the height of the three-dimensional modeled object in the three-dimensional image data. The imposition processing unit 42 arranges the slice image of the processed three-dimensional image data and the two-dimensional image data on the same recording medium. The imposition processing unit 42 generates imposition control data that associates the two-dimensional image data and the three-dimensional image data with positions of the two-dimensional image data and the slice image of the three-dimensional image data which are arranged on the recording medium 50, and outputs imposition control data to the image forming apparatus 12. Hereinafter, the arrangement of the slice image of the three-dimensional image data and the two-dimensional image data on the same recording medium 50 is referred to as "imposition".

When data described in a page description language (hereinafter referred to as "PDL data") has been acquired, the file format conversion unit 43 is configured to convert the acquired PDL data into intermediate data.

The raster processing unit 44 is configured to perform raster processing on the intermediate data obtained by the file format conversion unit 43 to generate the raster image data. The raster processing unit 44 is configured to perform raster processing on slice image data obtained by an image data generation unit 47 (described below) to generate the raster image data.

The three-dimensional image data processing unit 45 includes a slice processing unit 46, the image data generation unit 47, and a control data generation unit 48, and is configured to process the acquired three-dimensional image data to generate the slice image data and the control data.

The slice processing unit 46 is configured to generate the slice data from the three-dimensional image data processed so as to reduce the difference in the acquired height. The image data generation unit 47 is configured to generate the slice image data from the slice data obtained by the slice processing unit 46. The control data generation unit 48 is configured to generate control data from the slice data obtained by the slice processing unit 46. The control data storage unit 49 is configured to store the control data obtained by the control data generation unit 48.

(Two-Dimensional Data Processing)

The "two-dimensional data processing" for the two-dimensional image will be described.

When the image formation based on the two-dimensional image data has been instructed, the two-dimensional image data is acquired as PDL data. The PDL data is converted into the intermediate data by the file format conversion unit 43 and is output to the raster processing unit 44. The raster processing unit 44 performs raster processing on the intermediate data to generate the raster image data of the two-dimensional image. The raster image data is output to the image forming apparatus 12.

Here, the "intermediate data" is section data obtained by segmenting each object (for example, a character font, a graphics figure, or image data), which is an image element of an image of a page, based on each scan line of raster scan. The section data represents a section occupied by an object on one scanning line. The section data is represented by, for example, a set of coordinates at two ends of the section. The section data includes information that defines a pixel value of each pixel in the section. The PDL data is converted to the intermediate data and is transferred, so that a data transfer speed in the information processing apparatus 10 is improved.

(Three-Dimensional Image Data Processing)

The "three-dimensional image data processing" for the three-dimensional image data will be described.

When the three-dimensional modeling based on the three-dimensional image data has been instructed, the three-dimensional image data of the three-dimensional model is acquired. The slice processing unit 46 generates the slice data from the three-dimensional image data. The generated slice data is output to each of the image data generation unit 47 and the control data generation unit 48. Here, the "three-dimensional image data" and the "slice data" will be described in detail.

As the three-dimensional image data of the three-dimensional model M, for example, OBJ format three-dimensional image data (hereinafter referred to as "OBJ data") is used. In the OBJ data, the three-dimensional model M is represented as a set of triangular polygons. The three-dimensional image data may be in another format which is an STL format or the like. The STL format does not include color information, so that color information is added when the STL format is used.

Hereinafter, a case in which the three-dimensional image data is the OBJ data will be described. The OBJ data includes an OBJ file that handles shape data and an MTL file that handles color information. In the OBJ file, a surface number of a polygon, the coordinate data of each vertex of the triangular polygon, and the like are associated with each polygon. In the MTL file, color information is associated with each polygon.

The slice processing unit 46 sets a direction of the slice surface obtained by slicing the three-dimensional model M along a direction intersecting the stacking direction. Then, the slice processing unit 46 sequentially slices the three-dimensional model M from one end at a predetermined stacking pitch (a distance) k in a direction orthogonal to the slice surface along the set direction of the slice surface, and generates the slice data each time the three-dimensional model M is sliced.

At this time, the number of the slice surface at one end at which the slice is started is set as "1", and the number of the obtained slice surface is increased by "1" each time the three-dimensional model M is sliced. In the example illustrated in FIG. 3A, there are T slice surfaces from number 1 to number T. The slice data represents a cross-sectional image obtained by slicing the three-dimensional model M to the slice surface. Specifically, the slice data represents the cross-sectional image of the three-dimensional model M by the number of the slice surface, the coordinate data of the vertex of the intersection region where the polygon and the slice surface intersect, and the color information set for the polygon that intersects the slice surface. T pieces of slice data from number 1 to number T are generated according to the T slice surfaces. The stacking pitch k is an example of the predetermined interval.

The image data generation unit 47 is configured to generate the slice image data from the slice data obtained by the slice processing unit 46. The slice data is converted into the slice image data in a file format which is JPEG or the like. When the slice image data is generated, a colored region may be added to the slice image. The generated slice image data is output to the raster processing unit 44. The raster processing unit 44 is configured to perform the raster processing on the slice image data obtained by the image data generation unit 47 to generate the raster image data. The generated raster image data of the slice image is output to the image forming apparatus 12.

The image data generation unit 47 may generate the intermediate data. In this case, the image data generation unit 47 generates the PDL data from the slice data obtained by the slice processing unit 46, and outputs the PDL data to the file format conversion unit 43. The PDL data is converted into the intermediate data by the file format conversion unit 43 and is output to the raster processing unit 44. The raster processing unit 44 performs raster processing on the intermediate data to generate the raster image data of the slice image. The raster image data is output to the image forming apparatus 12.

The control data generation unit 48 is configured to generate the control data from the slice data obtained by the slice processing unit 46. The generated control data is associated with the number (which is the same as the number of the slice surface) of the slice image, and is stored in the control data storage unit 49. When an instruction to start the post-processing is received from the user, the control data is read from the control data storage unit 49 and is output to the post-processing apparatus 14.

When the three-dimensional modeled object is modeled on the recording medium 50, the control data is associated with the position on the recording medium 50 of the slice image of the lowest layer, that is, the slice image associated with the number "1". Position information of the three-dimensional modeled object on the recording medium 50 may be associated with, for example, the three-dimensional model M. The post-processing apparatus 14 cuts out and glues the three-dimensional modeled object such that the three-dimensional modeled object is provided at a designated position.

That is, the information processing apparatus 10 acquires the image data from each of a plurality of pieces of received printing processing, and outputs the raster image data and the imposition control data (hereinafter referred to as "image forming information") from each of the plurality of pieces of received printing processing to the image forming apparatus 12, and outputs the control data to the post-processing apparatus 14.

The information processing apparatus 10 includes the control data storage unit 49 in the functional block diagram of the information processing apparatus 10 shown in FIG. 8. However, a storage unit configured to store the control data may be provided outside the information processing apparatus 10. For example, the storage unit may be provided in the post-processing apparatus 14. In this case, the control data generated by the information processing apparatus 10 is stored in the storage unit of the post-processing apparatus 14, and is read from the storage unit of the post-processing apparatus 14 and used.

As described above, in order to generate the slice data corresponding to the three-dimensional model M, it is necessary to set the three-dimensional image data in the imposition processing unit 42.

Figure 9:
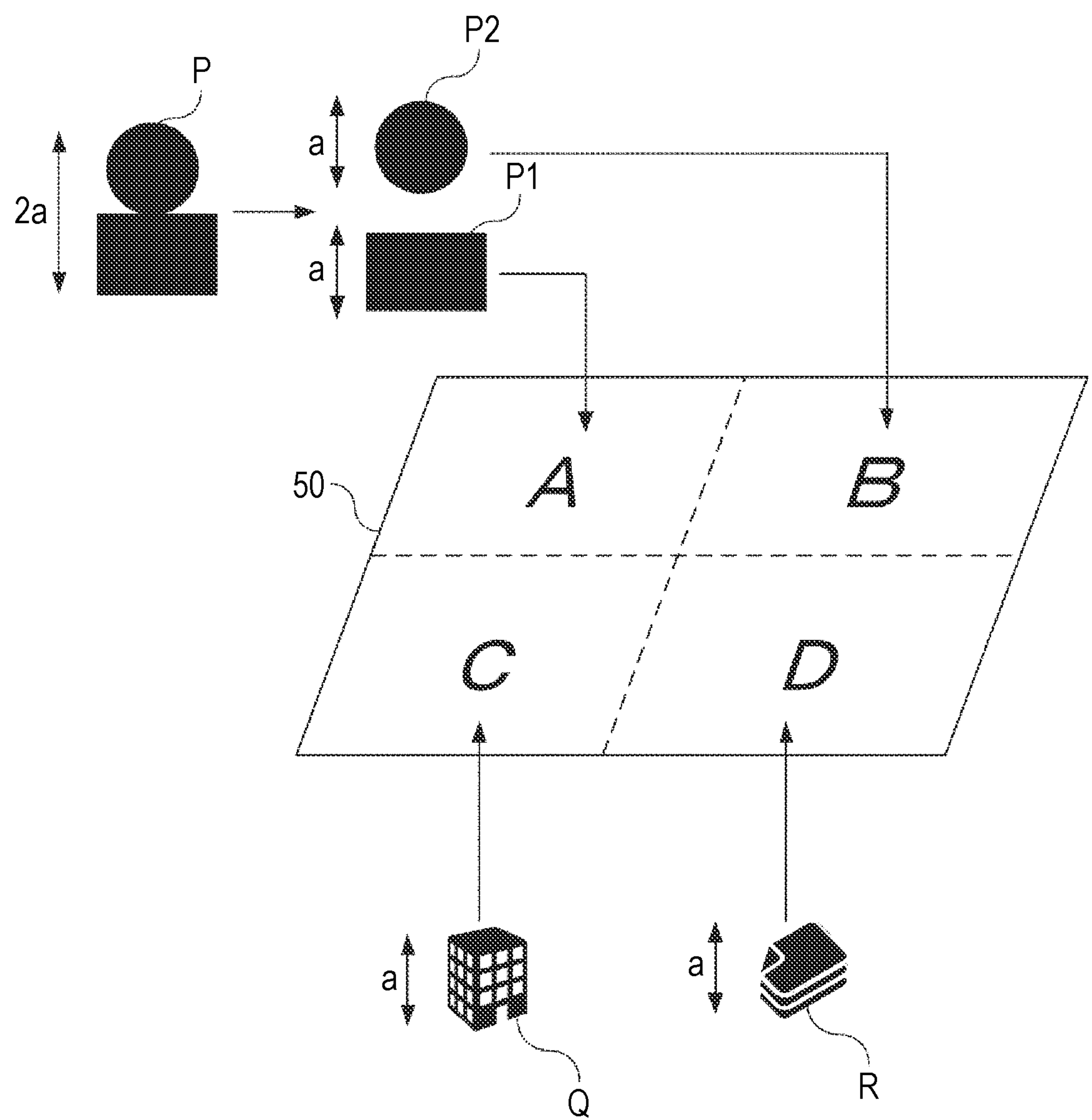
FIG. 9 is a schematic view, for describing division of a three-dimensional modeled object, illustrating an example of processing of imposing a plurality of pieces of image data on a same recording medium according to a first exemplary embodiment.

Therefore, as illustrated in FIG. 9, a method of imposing the two-dimensional image data and the three-dimensional image data on the recording medium will be described.

FIG. 9 is a schematic view illustrating an example of processing of imposing a plurality of pieces of image data for describing division of a three-dimensional modeled object P on the recording medium according to the present exemplary embodiment.

As illustrated in FIG. 9, a form will be described in which three-dimensional image data having a height of 2*a* when the three-dimensional modeled object P has been formed, three-dimensional image data having a height of a when a three-dimensional modeled object Q has been formed, and two-dimensional image data having the height of a when a two-dimensional image R has been formed are imposed. Hereinafter, the three-dimensional image data having the height of a when the three-dimensional modeled object Q has been formed is referred to as "the other type of three-dimensional image data", and the two-dimensional image data having the height of a when the two-dimensional image R has been formed is referred to as "the other type of two-dimensional image data". The three-dimensional modeled object Q in the other type of three-dimensional image data is referred to as "the other three-dimensional modeled object Q", and the two-dimensional image R in the other type of two-dimensional image data is referred to as "the other two-dimensional image R". The other type of three-dimensional image data and the other type of two-dimensional image data are examples of the other type of image data.

The information processing apparatus 10 divides the three-dimensional image data so as to reduce the height of the three-dimensional modeled object P, and imposes each piece of the divided three-dimensional image data. Specifically, the information processing apparatus 10 arranges three-dimensional image data P1 and three-dimensional image data P2 that have the height of a by being divided into a region A and a region B, and arranges the other type of three-dimensional image data and the other type of two-dimensional image data that have the height of a in a region C and a region D, respectively.

With this processing, when the three-dimensional modeled object is modeled and the two-dimensional image is formed by using the imposition control data imposed according to the above-described arrangement, the heights of the divided three-dimensional image data and the heights of the other type of three-dimensional image data and the other type of two-dimensional image are aligned. Therefore, a difference among the height of each of the divided three-dimensional image data, the height of the other type of three-dimensional image data and the height of the other type of two-dimensional image is reduced and the slice image of the divided three-dimensional image data, the slice image of the other type of three-dimensional image data, and the other type of two-dimensional image are imposed on the same recording medium 50.

A mode in which the three-dimensional image data is divided into two according to the present exemplary embodiment has been described. However, the present invention is not limited thereto. The three-dimensional image data may be divided into three or more parts, or may be divided for each part of the three-dimensional modeled object P. A mode in which each piece of the divided three-dimensional image data is arranged in a different region has been described. However, the present invention is not limited thereto. Each piece of the divided three-dimensional image data may be arranged in the same region according to a size of a blank space of a region to be the unnecessary part 53.

Figure 10:
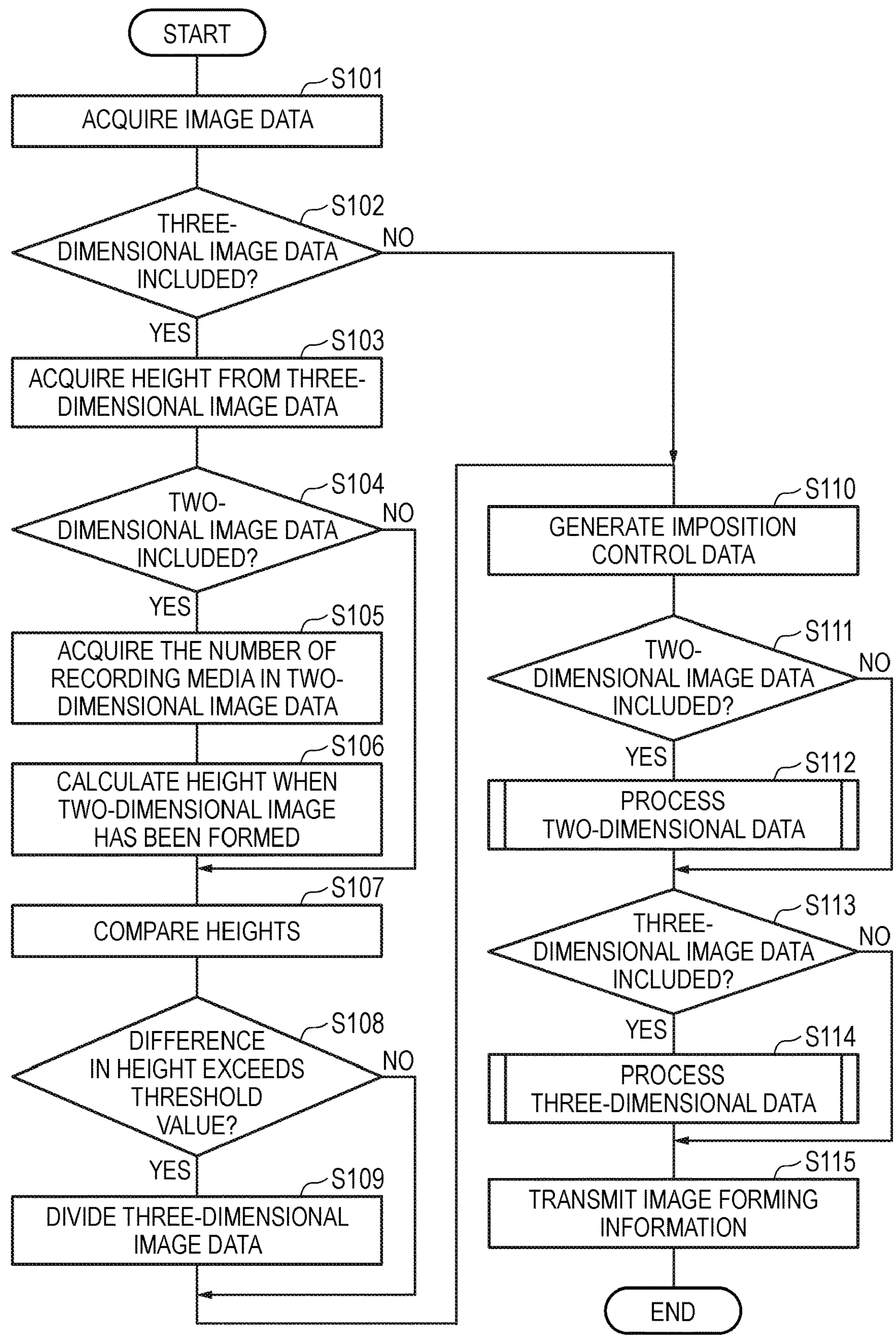
FIG. 10 is a flowchart showing an example of a processing procedure of an information processing program according to the first exemplary embodiment.

Next, operation of the information processing apparatus 10 will be described with reference to FIG. 10. FIG. 10 is a flowchart showing an example of a processing procedure of an information processing program executed by the information processing apparatus 10. The information processing program is stored in a ROM 30B of the information processing apparatus 10. When the three-dimensional image data is received from the user, the information processing program is read from the ROM 30B and executed by the CPU 30A of the information processing apparatus 10.

In step S101, the CPU 30A acquires the image data.

In step S102, the CPU 30A determines whether the acquired image data includes the three-dimensional image data. When the image data includes the three-dimensional image data (step S102: YES), the CPU 30A proceeds to step S103. On the other hand, when the image data does not include the three-dimensional image data (step S102: NO), the CPU 30A proceeds to step S110.

In step S103, the CPU 30A acquires the height of the three-dimensional modeled object P from the three-dimensional image data.

In step S104, the CPU 30A determines whether the acquired image data includes the two-dimensional image data. When the image data includes the two-dimensional image data (step S104: YES), the CPU 30A proceeds to step S105. On the other hand, when the image data does not include the two-dimensional image data (step S104: NO), the CPU 30A proceeds to step S107.

In step S105, the CPU 30A acquires the number of recording media 50 in the two-dimensional image data.

In step S106, based on the number of the recording media 50 in the two-dimensional image data, the CPU 30A calculates the height when the two-dimensional image has been formed. The height when the two-dimensional image has been formed is calculated, for example, by multiplying the number of recording media 50 by a thickness of the recording medium 50.

In step S107, the CPU 30A compares the height when the two-dimensional image has been formed and the height when the three-dimensional modeled object has been formed.

In step S108, the CPU 30A determines whether a difference between the compared heights exceeds a threshold value. When the difference between the heights exceeds the threshold value (step S108: YES), the CPU 30A proceeds to step S109. On the other hand, when the difference between the heights does not exceed the threshold value (step S108: NO), the CPU 30A proceeds to step S110.

Here, the threshold value is not particularly limited, and may be set by any method. For example, the threshold value may be set by the predetermined number of the recording media, or may be calculated using the height of the three-dimensional modeled object P and the height of the other type of image data. Specifically, when the difference in height obtained by comparing the three-dimensional image data and the other type of image data is ¼ or more of the height of the three-dimensional modeled object P, the number of the recording media when the three-dimensional image data has been divided into two is smaller than that when the three-dimensional image data is not divided into two. That is, when the three-dimensional image data is divided into two, the threshold value is set to the number of the recording media so that the height of the three-dimensional modeled object P is ¼.

In step S109, the CPU 30A divides the three-dimensional image data.

In step S110, the CPU 30A generates the imposition control data in which the two-dimensional image data and the three-dimensional image data are arranged on the recording media 50.

In step S111, the CPU 30A determines whether the acquired image data includes the two-dimensional image data. When the image data includes the two-dimensional image data (step S111: YES), the CPU 30A proceeds to step S112. On the other hand, when the image data does not include the two-dimensional image data (step S111: NO), the CPU 30A proceeds to step S113.

In step S112, the CPU 30A performs two-dimensional data processing. Here, the two-dimensional data processing is "two-dimensional data processing" for the above-described two-dimensional image.

In step S113, the CPU 30A determines whether the acquired image data includes the three-dimensional image data. When the image data includes the three-dimensional image data (step S113: YES), the CPU 30A proceeds to step S114. On the other hand, when the image data does not include the three-dimensional image data (step S113: NO), the CPU 30A proceeds to step S115.

In step S114, the CPU 30A performs three-dimensional image data processing. Here, the three-dimensional image data processing is "three-dimensional image data processing" for the above-described three-dimensional image.

In step S115, the CPU 30A transmits the image forming information including the raster image data and a position at which the raster image is arranged on the recording medium 50 to the image forming apparatus 12.

As described above, according to the present exemplary embodiment, when a plurality of pieces of the image data are recorded on the same recording medium 50, the difference in height becomes small when each piece of the image data has been formed. Therefore, when the height of the three-dimensional modeled object P is different from the height, the thickness, and the like of the recording medium 50 to which the other piece of printing processing has been performed, generation of the extra recording medium 50 is reduced.

[Second Exemplary Embodiment]

In the first exemplary embodiment, the mode has been described in which the three-dimensional image data in the three-dimensional modeled object P is divided. In the present exemplary embodiment, a mode in which the three-dimensional image data is rotated will be described. The schematic configuration example (see FIG. 1) of the three-dimensional modeling system, the other schematic configuration example (see FIG. 2) of the three-dimensional modeling system, and the sheet stacking type three-dimensional modeling process (see FIG. 3) according to the present exemplary embodiment are the same as those in the first exemplary embodiment, so that a description thereof will be omitted. The slice image (see FIG. 4), the control data (see FIG. 5) for specifying the cutout line, the control data (see FIG. 6) for specifying the glued region, the configuration example (see FIG. 7) of the main part of the electric system of the information processing apparatus 10, and the functional configuration example (see FIG. 8) of the information processing apparatus 10 according to the present exemplary embodiment are the same as those in the first exemplary embodiment, so that a description thereof will be omitted.

Figure 11:
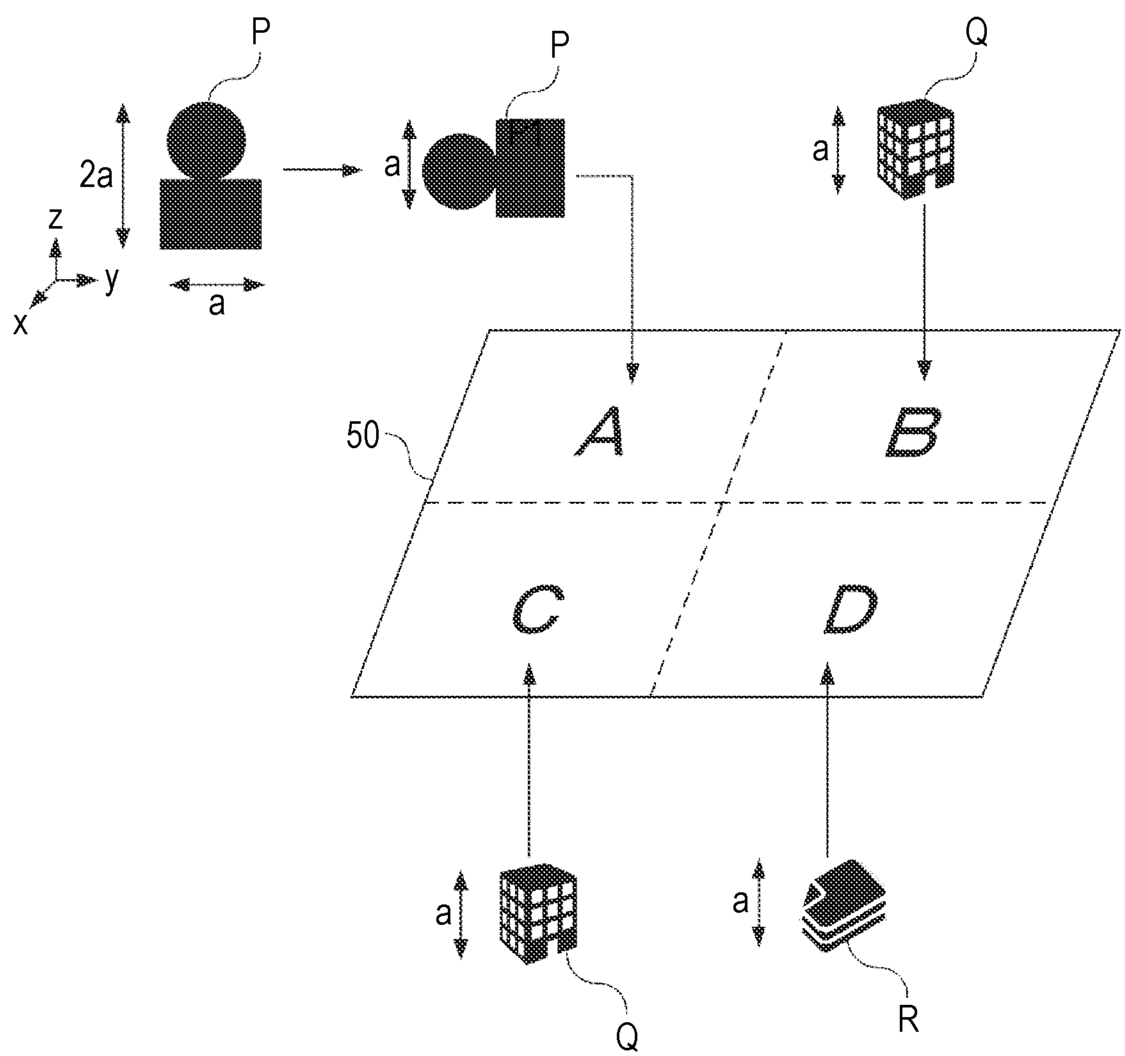
FIG. 11 is a schematic view, for describing rotation of a three-dimensional modeled object, illustrating an example of processing of imposing a plurality of pieces of image data on a same recording medium according to a second exemplary embodiment.

First, a method of imposing the two-dimensional image data and the slice image of the three-dimensional image data on the same recording medium and setting the three-dimensional model M will be described with reference to FIG. 11. FIG. 11 is a schematic view illustrating an example of processing of imposing a plurality of pieces of image data for describing rotation of the three-dimensional modeled object P on the same recording medium according to the present exemplary embodiment.

As illustrated in FIG. 11, a mode will be described in which a height is 2*a* and a width is a when the three-dimensional modeled object P has been modeled in the three-dimensional image data, and a height is a when the other type of three-dimensional image data and the other type of two-dimensional image that are to be imposed on the recording media 50. Hereinafter, a direction along a depth of the three-dimensional modeled object P is referred to as an X-axis direction, a direction along the width of the three-dimensional modeled object P is referred to as a Y-axis direction, a direction in which the recording media 50 are stacked is referred to as a Z-axis direction, a direction rotating about an X axis is referred to as a roll angle direction, and a direction rotating about a Y axis is referred to as a pitch angle direction.

The information processing apparatus 10 rotates the three-dimensional image data and exchanges the height and the width so as to reduce the height of the three-dimensional modeled object P, and arranges the rotated three-dimensional image data on the recording medium. Specifically, the information processing apparatus 10 arranges the three-dimensional image data that has been rotated by 90 degrees in the roll angle direction and has the height of a in the region A of the recording medium, and arranges the other type of three-dimensional image data and the other type of two-dimensional image data that have the height of a in the region B, the region C, and the region D, respectively.

With this processing, the height of the rotated three-dimensional image data and the heights of the other type of three-dimensional image data and the other type of two-dimensional image are aligned. Therefore, the slice image of the rotated three-dimensional image data, the slice image of the other type of three-dimensional image data, and the other type of two-dimensional image are imposed on the same recording medium in a state where a difference in height thereof is reduced.

In the present exemplary embodiment, the mode has been described in which the three-dimensional image data is rotated by 90 degrees in the roll angle direction and a height direction and a width direction are exchanged. However, the present invention is not limited thereto. The height direction and a depth direction may be exchanged, or a direction and a degree of the rotation may be adjusted in detail in the pitch angle direction and the roll angle direction. For example, the height (stacking) of the three-dimensional modeled object may be smaller when a surface of the polyhedral three-dimensional modeled object P which is a triangular pyramid or the like is in contact with the recording medium 50 (an XY plane) than that when the three-dimensional modeled object P is exchanged between the height direction and the width direction or the depth direction (a roll angle or a pitch angle is rotated by 90 degrees). That is, the three-dimensional image data may be rotated such that any surface of the three-dimensional modeled object P is in contact with the recording medium 50.

Figure 12:
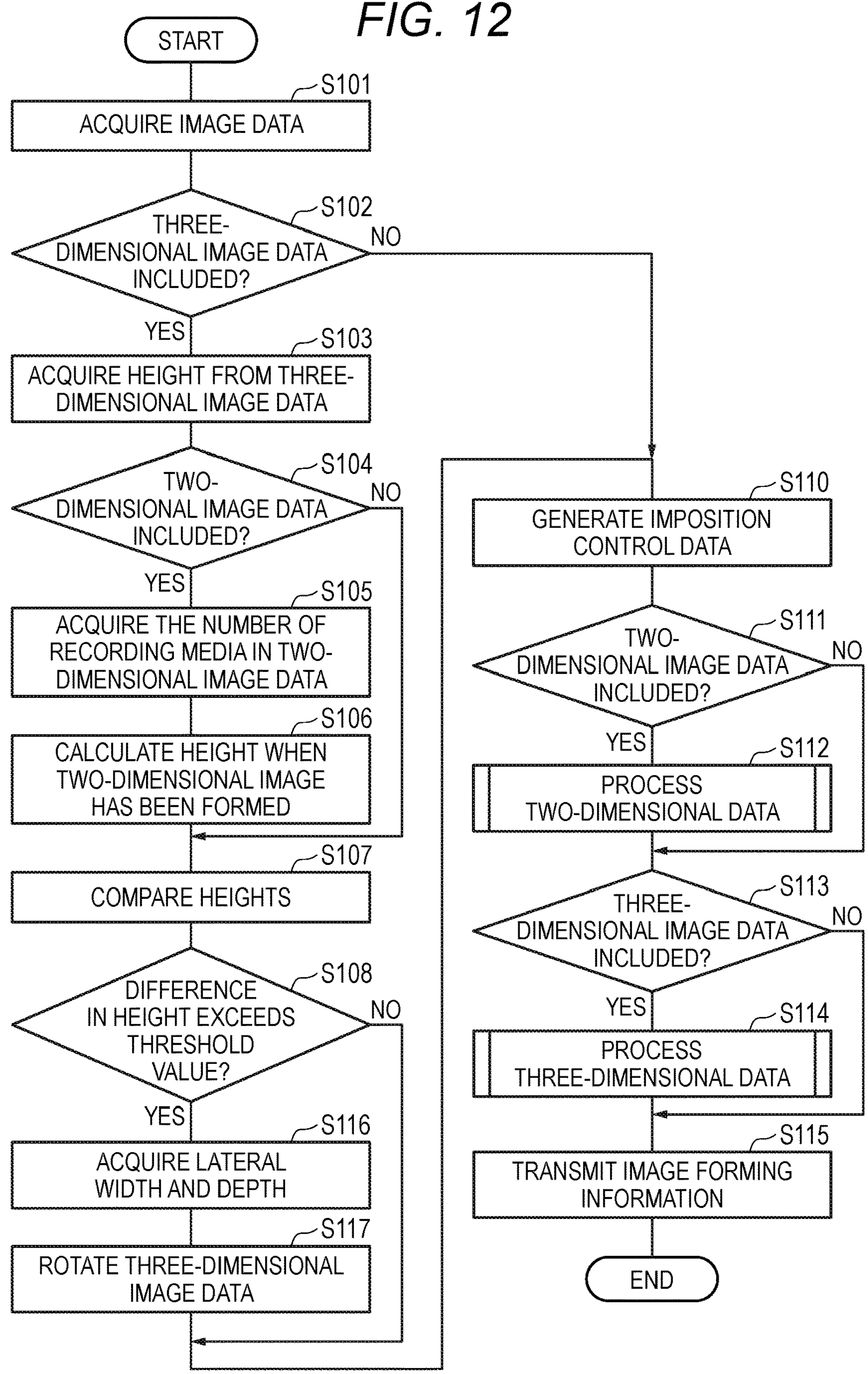
FIG. 12 is a flowchart showing an example of a processing procedure of an information processing program according to the second exemplary embodiment.

Next, operation of the information processing apparatus 10 will be described with reference to FIG. 12. FIG. 12 is a flowchart showing an example of the processing procedure of the information processing program executed by the information processing apparatus 10. The information processing program is stored in the ROM 30B of the information processing apparatus 10. When the image data is received from the user, the information processing program is read from the ROM 30B and executed by the CPU 30A of the information processing apparatus 10. Steps of the information processing shown in FIG. 12 that are the same as those in FIG. 10 are denoted by the same reference numerals as those in FIG. 10, and a description thereof will be omitted.

In step S116, the CPU 30A acquires the width and the depth of the three-dimensional image data.

In step S117, the CPU 30A rotates the three-dimensional image data, and sets the height to the smallest one of the height, the width, and the depth of the three-dimensional image data.

As described above, according to the present exemplary embodiment, when a plurality of pieces of the image data are recorded on the same recording medium 50, the difference in height becomes small when each piece of the image data has been formed. Therefore, when the height of the three-dimensional modeled object P is different from the height, the thickness, and the like of the recording medium 50 to which the other piece of printing processing has been performed, generation of the extra recording medium 50 is reduced.

In the present exemplary embodiment, the mode in which the three-dimensional image data is rotated so as to reduce the number of recording media 50 has been described. However, the present invention is not limited thereto. The three-dimensional image data may be rotated so as to reduce a blank space of the recording medium 50. For example, when the blank space of the recording medium 50 is large, the three-dimensional image data may be rotated so as to increase a cross-sectional area (a cross-sectional image) of the three-dimensional modeled object P when the three-dimensional image has been sliced.

[Third Exemplary Embodiment]

In the first exemplary embodiment, the mode has been described in which the three-dimensional image data in the three-dimensional modeled object P is divided. In the present exemplary embodiment, a mode in which a plurality of pieces of the other type of three-dimensional image data and the other type of two-dimensional image data are arranged will be described. The schematic configuration example (see FIG. 1) of the three-dimensional modeling system, the other schematic configuration example (see FIG. 2) of the three-dimensional modeling system, and the sheet stacking type three-dimensional modeling process (see FIG. 3) according to the present exemplary embodiment are the same as those in the first exemplary embodiment, so that a description thereof will be omitted. The slice image (see FIG. 4), the control data (see FIG. 5) for specifying the cutout line, the control data (see FIG. 6) for specifying the glued region, the configuration example (see FIG. 7) of the main part of the electric system of the information processing apparatus 10, and the functional configuration example (see FIG. 8) of the information processing apparatus 10 according to the present exemplary embodiment are the same as those in the first exemplary embodiment, so that a description thereof will be omitted.

Figure 13:
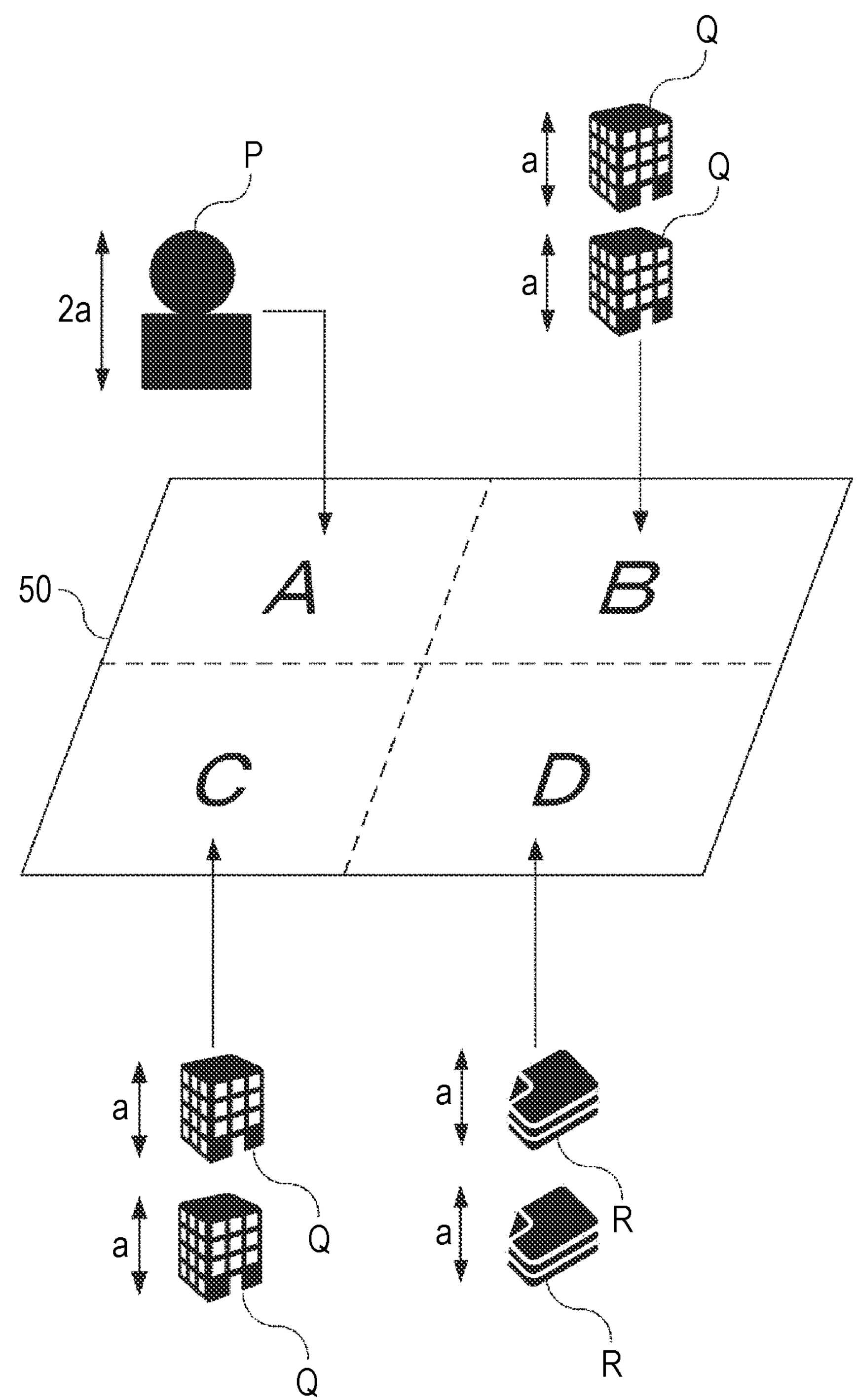
FIG. 13 is a schematic view illustrating an example of processing of imposing a plurality of pieces of image data on a same recording medium according to a third exemplary embodiment.

First, a method of imposing the two-dimensional image data and the slice image of the three-dimensional image data on the same recording medium and setting the three-dimensional model M will be described with reference to FIG. 13. FIG. 13 is a schematic view illustrating an example of processing of imposing a plurality of pieces of image data on a same recording medium according to the present exemplary embodiment.

As illustrated in FIG. 13, a mode will be described in which the height is 2*a* when the three-dimensional modeled object has been modeled in the three-dimensional image data, and the height is a when the other type of three-dimensional image data and the other type of two-dimensional image have been formed, in which the slice image of the other type of three-dimensional image data and the other type of two-dimensional image are imposed on the same recording medium 50 as the slice image of the three-dimensional image data.

The information processing apparatus 10 arranges the other type of three-dimensional image data and the other type of two-dimensional images in the stacking direction so that the height is 2*a* when the other three-dimensional modeled object in the other type of three-dimensional image data has been modeled and when the other two-dimensional images have been formed. Specifically, the information processing apparatus 10 arranges the three-dimensional image data having the height of 2*a* in the region A of the recording media 50, and arranges the other type of three-dimensional image data and the other type of two-dimensional image data that have the height of a so as to form the sets of the other type of three-dimensional image data and sets of the other type of two-dimensional image data in the region B, the region C, and the region D in the stacking direction. For example, the information processing apparatus 10 arranges the three-dimensional image data having the height of 2*a* in the region A so as to form one set of the three-dimensional image data, and arranges the other type of three-dimensional image data having the height of a in the region B so as to model two sets of the other type of three-dimensional image data in the stacking direction. That is, while modeling the three-dimensional modeled object P in the three-dimensional image data having the height of 2*a* in the region A, the information processing apparatus 10 models two of the other three-dimensional modeled objects Q in the other type of three-dimensional image data having the height of a in the region B.

With this processing, the information processing apparatus 10 reduces the difference between the height of the three-dimensional modeled object P and the height of the other three-dimensional modeled object Q. Therefore, the slice image of the three-dimensional image data, the slice image of the other type of three-dimensional image data, and the other type of two-dimensional image are imposed on the same recording medium 50 in a state where a difference in height thereof is reduced.

In the present exemplary embodiment, a mode has been described in which the plurality of the other three-dimensional modeled objects Q are modeled. However, the present invention is not limited thereto. The plurality of the other two-dimensional images R may be formed, or the plurality of three-dimensional modeled objects P may be modeled. In the present exemplary embodiment, the mode has been described in which the plurality of the other three-dimensional modeled objects Q are modeled with respect to one three-dimensional modeled object P. However, the present invention is not limited thereto. While the plurality of three-dimensional modeled objects P may be modeled, the plurality of the other three-dimensional modeled objects Q may be formed, or the plurality of the other two-dimensional images R may be formed. In the present exemplary embodiment, the mode has been described in which the plurality of the same three-dimensional modeled objects and the same two-dimensional images are formed at a same position. However, the present invention is not limited thereto. Different three-dimensional modeled objects and two-dimensional images may be formed at the same position. For example, the other three-dimensional modeled object Q having the height of a and the other two-dimensional image R having the height of a may be formed at the same position, and may be processed so as to have the height of 2*a*. That is, as long as the difference in height between the three-dimensional modeled object and the two-dimensional image becomes small, the three-dimensional modeled object and the two-dimensional image may be formed in the same region in any combination.

Next, operation of the information processing apparatus 10 will be described with reference to FIG. 14. FIG. 14 is a flowchart showing an example of the processing procedure of the information processing program executed by the information processing apparatus 10. The information processing program is stored in the ROM 30B of the information processing apparatus 10. When the image data is received from the user, the information processing program is read from the ROM 30B and executed by the CPU 30A of the information processing apparatus 10. Steps of the information processing shown in FIG. 14 that are the same as those in FIG. 10 are denoted by the same reference numerals as those in FIG. 10, and a description thereof will be omitted.

In step S118, the CPU 30A determines whether to form the plurality of the other three-dimensional modeled objects Q and the other two-dimensional images R. When the CPU 30A is to form the plurality of the other three-dimensional modeled objects Q and the other two-dimensional images R (step S118: YES), the CPU 30A proceeds to step S119. On the other hand, when the CPU 30A is not to form the plurality of the other three-dimensional modeled objects Q and the other two-dimensional images R (step S118: NO), the CPU 30A proceeds to step S110.

In step S119, the CPU 30A sets the image data sets to be formed in the imposition control data so as to form the plurality of three-dimensional modeled objects and two-dimensional images in the same region.

As described above, according to the present exemplary embodiment, when the sets of the image data are recorded on the same recording medium 50, the difference in height becomes small when each set of the image data has been formed. Therefore, when the height of the three-dimensional modeled object P is different from the height, the thickness, and the like of the recording medium 50 to which the other piece of printing processing has been performed, generation of the extra recording medium 50 is reduced.

[Fourth Exemplary Embodiment]

In the first exemplary embodiment, the mode has been described in which the three-dimensional image data in the three-dimensional modeled object P is divided. In the present exemplary embodiment, a form will be described in which the size of the three-dimensional image data in the three-dimensional modeled object P is enlarged and reduced. The schematic configuration example (see FIG. 1) of the three-dimensional modeling system, the other schematic configuration example (see FIG. 2) of the three-dimensional modeling system, and the sheet stacking type three-dimensional modeling process (see FIG. 3) according to the present exemplary embodiment are the same as those in the first exemplary embodiment, so that a description thereof will be omitted. The slice image (see FIG. 4), the control data (see FIG. 5) for specifying the cutout line, the control data (see FIG. 6) for specifying the glued region, the configuration example (see FIG. 7) of the main part of the electric system of the information processing apparatus 10, and the functional configuration example (see FIG. 8) of the information processing apparatus 10 according to the present exemplary embodiment are the same as those in the first exemplary embodiment, so that a description thereof will be omitted.

Figure 15:
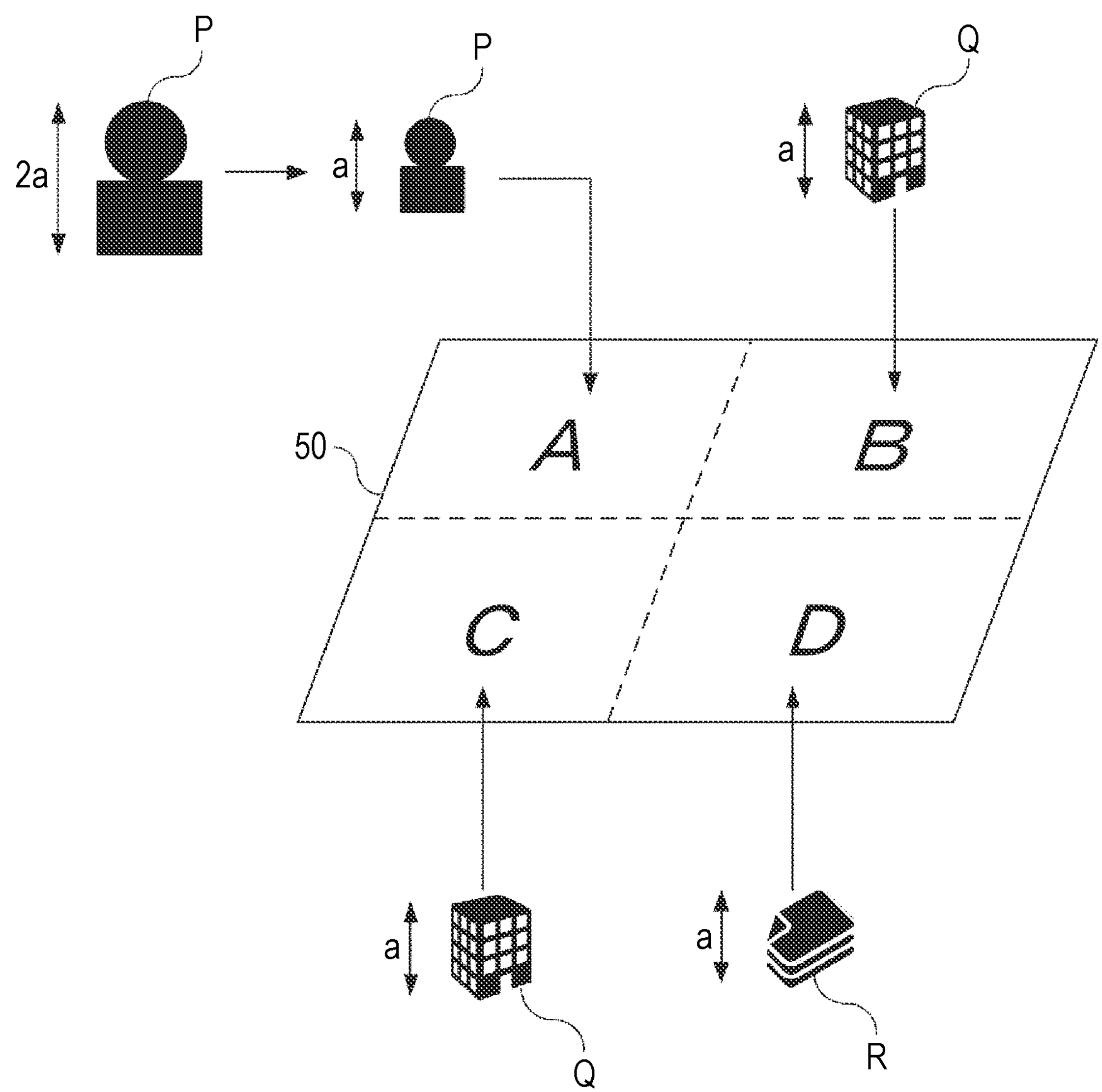
FIG. 15 is a schematic view, for describing enlargement and reduction of a three-dimensional modeled object, illustrating an example of processing of imposing a plurality of pieces of image data on a same recording medium according to a fourth exemplary embodiment.

First, a method of imposing the two-dimensional image data and the slice data of the three-dimensional image data on the same recording medium 50 and setting the three-dimensional model M will be described with reference to FIG. 15. FIG. 15 is a schematic view illustrating an example of processing of imposing a plurality of pieces of image data for describing enlargement and reduction of the three-dimensional modeled object P on a same recording medium according to the present exemplary embodiment.

As illustrated in FIG. 15, a mode will be described in which the height is 2*a* when the three-dimensional modeled object P in the three-dimensional image data has been modeled, and the height is a when the other three-dimensional modeled object Q in the other type of three-dimensional image data has been modeled and when the other two-dimensional image R has been formed.

The information processing apparatus 10 reduces a size of the three-dimensional image data in the three-dimensional modeled object P so as to have the height of a when the three-dimensional modeled object P has been modeled, and arranges the reduced three-dimensional image data on the recording media 50. Specifically, the information processing apparatus 10 reduces the size of the three-dimensional image data having the height of 2*a* when the three-dimensional modeled object P has been modeled so that the height becomes a when the three-dimensional modeled object P has been modeled. The information processing apparatus 10 arranges the reduced three-dimensional image data in the region A of the recording media 50, and arranges the other type of three-dimensional image data and the other type of two-dimensional image data that have the height of a so as to form the plurality of pieces of the other type of three-dimensional image data and the other type of two-dimensional image data in the region B, the region C, and the region D.

With this processing, the information processing apparatus 10 reduces the difference between the height of the three-dimensional modeled object P and the height of the other three-dimensional modeled object Q. Therefore, the slice image of the three-dimensional image data, the slice image of the other type of three-dimensional image data, and the other type of two-dimensional image are imposed on the same recording medium 50 in a state where reducing the difference in height thereof.

When the size of the three-dimensional image data has been reduced so that the height becomes a when the three-dimensional modeled object P has been modeled, the height of the three-dimensional modeled object P is reduced, the width and the depth of the three-dimensional modeled object P are also reduced, and the entire three-dimensional modeled object P is reduced. A blank space of the region A of the recording medium 50 is increased by this processing. When the information processing apparatus 10 has reduced the size of the three-dimensional image data so that the height becomes a when the three-dimensional modeled object P has been formed, the information processing apparatus 10 may model the plurality of three-dimensional modeled objects in the region A according to the blank space of the region A of the recording medium 50.

In the present exemplary embodiment, the mode has been described in which the size of the three-dimensional image data is reduced so that the height becomes a when the three-dimensional modeled object P has been modeled. However, the present invention is not limited thereto. The size of the three-dimensional image data may be enlarged according to the other type of three-dimensional image data and the other type of two-dimensional image data.

Figure 16:
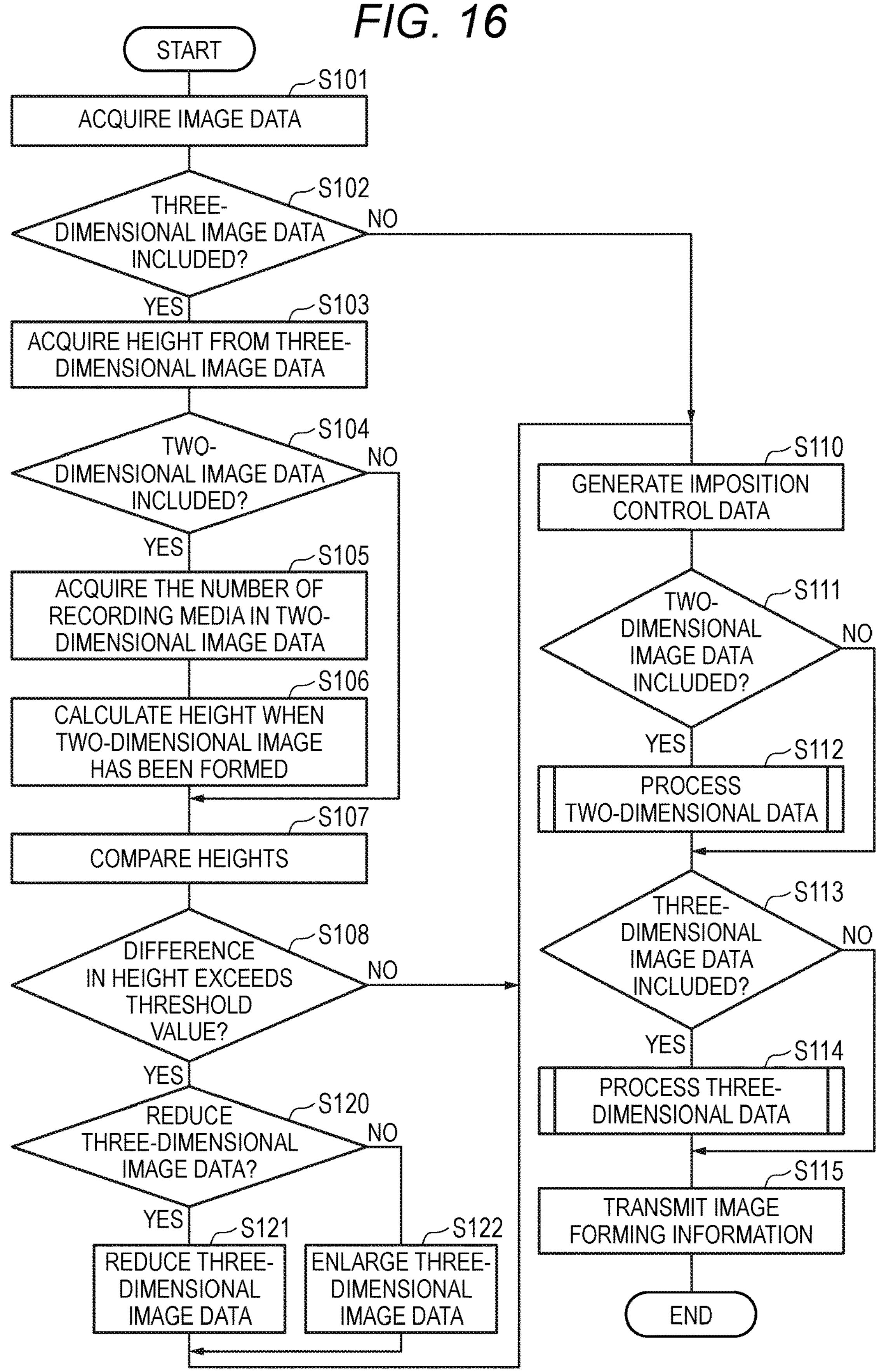
FIG. 16 is a flowchart showing an example of a processing procedure of an information processing program according to the fourth exemplary embodiment.

Next, operation of the information processing apparatus 10 will be described with reference to FIG. 16. FIG. 16 is a flowchart showing an example of the processing procedure of the information processing program executed by the information processing apparatus 10. The information processing program is stored in a ROM 30B of the information processing apparatus 10. When the image data is received from the user, the information processing program is read from the ROM 30B and executed by the CPU 30A of the information processing apparatus 10. Steps of the information processing shown in FIG. 16 that are the same as those in FIG. 10 are denoted by the same reference numerals as those in FIG. 10, and a description thereof will be omitted.

In step S120, the CPU 30A determines whether to reduce the size of the three-dimensional image data. When the CPU 30A is to reduce the size of the three-dimensional image data (step S120: YES), the CPU 30A proceeds to step S121. On the other hand, when the CPU 30A is not to reduce the size of the three-dimensional image data (step S120: NO), the CPU 30A proceeds to step S122.

In step S121, the CPU 30A reduces the size of the three-dimensional image data.

In step S122, the CPU 30A enlarges the size of the three-dimensional image data.

As described above, according to the present exemplary embodiment, when the plurality of pieces of the image data are recorded on the same recording media 50, the difference in height becomes small when each piece of the image data has been formed. Therefore, when the height of the three-dimensional modeled object P is different from the height, the thickness, and the like of the recording medium 50 to which the other piece of printing processing has been performed, generation of the extra recording medium 50 is reduced.

In the present exemplary embodiment, the mode has been described in which the height corresponding to the number of recording media 50 required to form the two-dimensional image data is compared with the height of the three-dimensional modeled object P in the three-dimensional image data. However, the present invention is not limited thereto. The number of recording media 50 may be compared. That is, the information processing apparatus 10 may arrange the three-dimensional image data and the two-dimensional image data so as to reduce the difference between the number of recording media 50 required to form the other two-dimensional image R and the number of recording media 50 required to model the three-dimensional modeled object P in the three-dimensional image data. The three-dimensional image data may be divided, rotated, and reduced and the three-dimensional image data and the two-dimensional image data may be arranged so as to minimize the number of recording media 50 to be used.

In the present exemplary embodiment, the mode has been described in which the plurality of three-dimensional image data and two-dimensional image data are imposed. However, the present invention is not limited thereto. For example, only a single piece of three-dimensional image data may be imposed on the recording medium 50. When only the single piece of three-dimensional image data is arranged on the recording medium 50, the three-dimensional image data may be divided, rotated, and reduced so as to minimize the height of the three-dimensional modeled object P in the three-dimensional image data.

In the present exemplary embodiment, the mode has been described in which the slice image of the three-dimensional image data and a part of the two-dimensional image data that have different heights are imposed on the same recording medium 50. However, the present invention is not limited thereto. The three-dimensional image data and the two-dimensional image data that have the same height may be selected to impose. When the three-dimensional image data and the two-dimensional image data that have the same height have been registered before a time limit of forming the three-dimensional image data and the two-dimensional image data, the three-dimensional image data and the two-dimensional image data may be selected and imposed. When the three-dimensional image data and the two-dimensional image data that have the same height have not been registered, only the single piece of three-dimensional image data may be imposed and formed on the recording medium 50.

In addition, the configuration of the information processing apparatus 10 described according to the above exemplary embodiment is an example, and may be changed depending on the situation without departing from the gist of the present invention.

The processing flow of the program described according to the above exemplary embodiment is also an example, and an unnecessary step may be deleted, a new step may be added, or the processing order may be changed without departing from the gist of the present invention.

In the above exemplary embodiments, the processor refers to a general processor, and includes a general-purpose processor which is a central processing unit (CPU) and the like, and dedicated processors which are a graphics processing unit (GPU), an application specific integrated circuit (ASIC), a field programmable gate array (FPGA), a programmable logic device and the like.

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiments, a mode has been described in which the information processing program has been stored (installed) in the ROM 30B in advance, but the present invention is not limited thereto. The program may be recorded in a recording medium which is a compact disc read only memory (CD-ROM), a digital versatile disc read only memory (DVD-ROM), a universal serial bus (USB) memory, or the like. The program may be downloaded from an external device via a network.

What is claimed is:

1. An information processing apparatus comprising a processor configured to:

acquire three-dimensional image data for printing processing for modeling a three-dimensional modeled object by forming respective images on a plurality of recording media and stacking the plurality of the recording media, and other image data for other printing processing than the printing processing for modeling the three-dimensional modeled object, determine an arrangement to form at least one of the respective images and at least a part of the other image data on same one of the recording media so as to reduce a difference between a height corresponding to the number of recording media to which the other image data is to be recorded and a height of the three-dimensional modeled object in the three-dimensional image data, and output image forming information for forming the three-dimensional image data and the other image data on the recording media to an image forming apparatus based on the determined arrangement.

2. The information processing apparatus according to claim 1, wherein the processor is configured to rotate the three-dimensional image data so as to change a direction of the stacking of the plurality of the recording media to model the three-dimensional modeled object, to perform the determining of the arrangement.

3. The information processing apparatus according to claim 2, wherein the rotation is a process of exchanging a height direction of the three-dimensional image data and a depth direction or a width direction of the three-dimensional image data.

4. The information processing apparatus according to claim 3, wherein the rotating is performed by the processor so that the number of the recording media is reduced.

5. The information processing apparatus according to claim 3, wherein the rotating is performed by the processor so that a blank space of the recording medium, at which the three-dimensional image data and the other image data are not formed, is reduced.

6. The information processing apparatus according to claim 2, wherein the rotating is performed by the processor so that the number of the recording media is reduced.

7. The information processing apparatus according to claim 2, wherein the rotating is performed by the processor so that a blank space of the recording medium, at which the three-dimensional image data and the other image data are not formed, is reduced.

8. The information processing apparatus according to claim 2, wherein the processor is configured to divide the three-dimensional image data to perform the determining of the arrangement.

9. The information processing apparatus according to claim 8, wherein the processor is configured to perform the determining of the arrangement so that a plurality of pieces of the divided three-dimensional image data are arranged on same one of the recording media.

10. The information processing apparatus according to claim 2, wherein the processor is configured to enlarge or reduce a size of the three-dimensional image data to perform the determining of the arrangement.

11. The information processing apparatus according to claim 2, wherein, the processor is configured to perform the determining of the arrangement of the three-dimensional image data so as to minimize a height of the recording media in a stacking direction in a case where only the three-dimensional image data is recorded on the recording media.

12. The information processing apparatus according to claim 1, wherein the processor is configured to divide the three-dimensional image data to perform the determining of the arrangement.

13. The information processing apparatus according to claim 12, wherein the processor is configured to perform the determining of the arrangement so that a plurality of pieces of the divided three-dimensional image data are arranged on same one of the recording media.

14. The information processing apparatus according to claim 1, wherein the processor is configured to enlarge or reduce a size of the three-dimensional image data to perform the determining of the arrangement.

15. The information processing apparatus according to claim 1, wherein, the processor is configured to perform the determining of the arrangement of the three-dimensional image data so as to minimize a height of the recording media in a stacking direction in a case where only the three-dimensional image data is recorded on the recording media.

16. A non-transitory computer readable medium storing an information processing program causing a computer to execute a process for three-dimensional modeling, the process comprising:

acquiring three-dimensional image data for printing processing for modeling a three-dimensional modeled object by forming respective images on a plurality of recording media and stacking the plurality of the recording media and other image data for other printing processing than the printing processing for modeling the three-dimensional modeled object, determining an arrangement to form at least one of the respective images and at least a part of the other image data on same one of the recording media so as to reduce a difference between a height corresponding to the number of recording media to which the other image data is to be recorded and a height of the three-dimensional modeled object in the three-dimensional image data, and outputting image forming information for forming the three-dimensional image data and the other image data on the recording media to an image forming apparatus based on the determined arrangement.

17. A three-dimensional modeling system comprising:

the information processing apparatus according to claim 1;

an image forming apparatus configured to form an image on a recording medium according to image forming information and image data; and a three-dimensional modeling post-processing apparatus configured to perform post-processing for three-dimensional modeling on a recording medium on which the image has been formed.

18. A three-dimensional modeling system comprising:

the information processing apparatus according to claim 2;

an image forming apparatus configured to form an image on a recording medium according to image forming information and image data; and a three-dimensional modeling post-processing apparatus configured to perform post-processing for three-dimensional modeling on a recording medium on which the image has been formed.

* * * * *